(12) United States Patent
Sakai

(10) Patent No.: US 8,488,091 B2
(45) Date of Patent: Jul. 16, 2013

(54) LIQUID CRYSTAL DISPLAY DEVICE

(75) Inventor: Akira Sakai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 234 days.

(21) Appl. No.: 13/120,043

(22) PCT Filed: Mar. 2, 2010

(86) PCT No.: PCT/JP2010/053351
§ 371 (c)(1),
(2), (4) Date: Mar. 21, 2011

(87) PCT Pub. No.: WO2010/137372
PCT Pub. Date: Dec. 2, 2010

(65) Prior Publication Data
US 2011/0170041 A1     Jul. 14, 2011

(30) Foreign Application Priority Data

May 27, 2009   (JP) ................ 2009-127933

(51) Int. Cl.
*G02F 1/1335* (2006.01)
(52) U.S. Cl.
USPC .......................... 349/118; 349/119
(58) Field of Classification Search
USPC .................... 349/117–119, 96–98
See application file for complete search history.

(56) References Cited

U.S. PATENT DOCUMENTS

| | | | |
|---|---|---|---|
| 6,922,222 B2* | 7/2005 | Miyachi et al. | 349/118 |
| 8,194,212 B2* | 6/2012 | Sakai | 349/119 |
| 2001/0048497 A1 | 12/2001 | Miyachi | |
| 2003/0071952 A1 | 4/2003 | Yoshida | |
| 2005/0225706 A1 | 10/2005 | Miyachi | |
| 2006/0203162 A1 | 9/2006 | Ito | |
| 2007/0076152 A1 | 4/2007 | Ito | |
| 2007/0159585 A1 | 7/2007 | Yoshida | |
| 2007/0216997 A1 | 9/2007 | Noguchi et al. | |
| 2009/0169822 A1* | 7/2009 | Chen et al. | 428/158 |
| 2009/0225263 A1 | 9/2009 | Miyachi | |

FOREIGN PATENT DOCUMENTS

| | | |
|---|---|---|
| CN | 101042442 A | 9/2007 |
| JP | 2002-040428 | 2/2002 |
| JP | 2002-055342 | 2/2002 |
| JP | 2003-186017 | 7/2003 |

(Continued)

OTHER PUBLICATIONS

International Search Report for PCT/JP2010/053351, mailed Jun. 15, 2010.

(Continued)

*Primary Examiner* — Dung Nguyen
(74) *Attorney, Agent, or Firm* — Nixon & Vanderhye P.C.

(57) ABSTRACT

The present invention provides an LCD device that can be easily produced and has a high contrast ratio in a wide viewing angle range. The LCD device includes in the following order: a first polarizer; a first birefringent layer (II); a first quarter-wave plate; a liquid crystal cell; a second quarter-wave plate having an Nz coefficient substantially equal to that of the first quarter-wave plate; a second birefringent layer (II) having an Nz coefficient and an in-plane retardation that are substantially equal to an Nz coefficient and an in-plane retardation of the first birefringent layer (II), respectively; and a second polarizer, wherein the device includes at least one birefringent layer (III) disposed at least one of: between the first birefringent layer (I) and the liquid crystal cell; and between the liquid crystal cell and the second birefringent layer (I).

7 Claims, 12 Drawing Sheets

FOREIGN PATENT DOCUMENTS

| | | |
|---|---|---|
| JP | 2003-207782 | 7/2003 |
| JP | 2005-099467 A | 4/2005 |
| JP | 2006-251050 | 9/2006 |
| JP | 2007-101874 | 4/2007 |
| JP | 2009-037049 | 2/2009 |

OTHER PUBLICATIONS

Ge et al., "Wide-View Circular Polarizers for Mobile Liquid Crystal Displays", IDRC08, 2008, pp. 266-268.

* cited by examiner (a)

(b)

(c)

(a)

(b)

LIQUID CRYSTAL DISPLAY DEVICE

This application is the U.S. national phase of International Application No. PCT/JP2010/053351 filed 2 Mar. 2010 which designated the U.S. and claims priority to Japanese Application No. 2009-127933 filed 27 May 2009, the entire contents of each of which are hereby incorporated by reference.

TECHNICAL FIELD

The present invention relates to liquid crystal display (LCD) devices, and more particularly relates to circularly-polarizing plate-including VA (vertical alignment) LCD devices.

BACKGROUND ART

LCD devices are widely used as display devices for various data-processing devices such as computers and televisions. In particular, TFT LCD devices (hereinafter, also referred to as "TFT-LCD") become popular, and expansion of the TFT-LCD market is expected. Such a situation creates a demand for much improved image quality.

Although the present description employs the TFT-LCD as an example, the present invention may be applicable to general LCDs such as passive matrix LCDs and plasma address LCDs, in addition to the TFT-LCDs.

The most widely used mode in the TFT-LCDs currently is a mode in which liquid crystals having positive dielectric anisotropy is horizontally aligned between parallel substrates, namely, the TN (twisted nematic) mode. In a TN LCD device, the alignment direction of LC molecules adjacent to one substrate is twisted by 90° to that of LC molecules adjacent to the other substrate. Such TN LCD devices are now produced at low cost and have been industrially mature, while they are less likely to achieve a higher contrast ratio.

In addition, there are known LCD devices having another mode in which liquid crystals having negative dielectric anisotropy are aligned vertically to parallel substrates, namely the VA LCD devices. In the VA LCD devices, LC molecules are aligned substantially vertically to the surfaces of the substrates when no voltage is applied. Therefore, the liquid crystal (LC) cell hardly shows birefringence and optical rotation, and light passes through the LC cell while hardly changing in its polarization state. Thus, in the case of the arrangement such that the LC cell is interposed between two polarizers (linearly polarizers) absorption axes of which are orthogonal to each other (hereinafter, also referred to as cross-Nicol polarizers), it is possible to display an almost perfectly black screen when no voltage is applied. When a voltage not lower than a threshold voltage is applied (hereinafter, simply referred to as "in the presence of an applied voltage"), the LC molecules are made to be substantially parallel to the substrates, the LC cell shows large birefringence, and the LCD device displays a white screen. Thus, such a VA LCD device easily achieves a very high contrast ratio.

The VA LCD devices show asymmetric viewing angle characteristics when LC molecules are all aligned in the same direction in the presence of an applied voltage. In view of this, for example, an MVA (multi-domain VA) LCD device, which is one kind of the VA LCD devices, is now being widely used. According to the MVA LCD device, the LC molecules in each pixel are aligned in multiple directions by a structurally-modified pixel electrode or an alignment control member such as a protrusion formed in the pixel.

The MVA LCD device is so designed that an axial azimuth of a polarizer makes an angle of 45° with an alignment azimuth of LC molecules in the presence of an applied voltage in order to maximize the transmittance in white display state. This is because the transmittance of a light beam passing through a birefringent medium interposed between the cross-Nicol polarizers is proportional to $\sin^2(2\alpha)$ where $\alpha$ (unit: rad) is defined as an angle made by the axis of the polarizer and a slow axis of the birefringent medium. In a typical MVA LCD device, the LC molecules are aligned separately in four domains, or at azimuths of 45°, 135°, 225°, and 315°. Also in the four-domain VA LCD devices, LC molecules are often aligned in Schlieren pattern or in undesired directions near at a domain boundary or near the alignment control member. This is one factor causing loss of transmittance.

In order to solve these problems, circularly-polarizing plate-including VA LCD devices are disclosed, for example, in Patent Document 1. According to the LCD device, the transmittance of a light beam passing through a birefringent medium interposed between a right-handed circularly-polarizing plate and a left-handed circularly-polarizing plate orthogonal to each other is independent of an angle made by the axis of the polarizer and the slow axis of the birefringent medium. Therefore, a desired transmittance can be secured as long as the alignment of the LC molecules can be controlled even in the case of the alignment azimuth of not 45°, 135°, 225°, and 315°. Accordingly, a conical protrusion may be disposed at the center of a pixel, thereby aligning the LC molecules at every azimuth, or alternatively the LC molecules may be aligned at random azimuths without any control of the alignment azimuth, for example. In the present description, the VA mode including use of a circularly-polarizing plate is referred to as CPVA mode or CP mode. In addition, the VA mode including use of a linearly-polarizing plate is referred to as LPVA mode or LP mode. As is well known, the circularly-polarizing plate is typically composed of a combination of a linearly-polarizing plate and a quarter-wave plate.

The circularly-polarized light beam switches its handedness when being reflected on a mirror and the like, and so when it enters a left-handed circularly-polarizing plate disposed on a mirror, the light beam that has been converted into a left-handed circularly-polarized light beam by the polarizing plate is converted into a right-handed circularly-polarized light beam by being reflected by the mirror. The right-handed circularly-polarized light beam can not transmit the left-handed circularly-polarizing plate. Thus, the circularly-polarizing plates are known to have an anti-reflection function. The anti-reflection function of the circularly-polarizing plates allows prevention of unnecessary reflection when display devices are viewed in bright environments such as outdoors. Therefore, the circularly-polarizing plate is known to have an effect of improving contrast ratio of display devices such as VA LCD devices in bright environments. The "unnecessary reflection" is considered to occur mainly due to transparent electrodes or metal wirings of TFT elements inside the display devices. If this unnecessary reflection occurs, even in a display device that can display an almost perfect black screen in dark environments, the contrast ratio is lowered because the light amount in a black screen is increased under observation in bright environments.

As mentioned above, in CPVA mode where a circularly-polarizing plate is used, the transmittance-improving effect and unnecessary reflection-preventing effect can be obtained, but common CPVA LCD devices have a low contrast ratio and can not show sufficient viewing angle characteristics as viewed from oblique directions. In this point, the CPVA LCD devices have room for improvement. In view of this, technologies involving use of birefringent layers (retardation films) for improving the viewing angle characteristics have been proposed. For example, Patent Document 1 discloses the following method (A); Patent Document 2 discloses the following method (B); Patent Document 3 discloses the following method (C); Patent Document 4 discloses the following method (D); and Non-patent Document 1 discloses the following method (E).
(A) Use of two quarter-wave plates satisfying the relation of nx>ny>nz
(B) Combination use of two quarter-wave plates satisfying the relation of nx>ny>nz and one or two birefringent layers (II) satisfying the relation of nx<ny≦nz
(C) Combination use of two quarter-wave plates satisfying the relation of nx>nz>ny and a birefringent layer satisfying the relation of nx=ny>nz
(D) Combination use of one or two half-wave plates satisfying the relation of nx>nz>ny in addition to the configuration (C)
(E) Combination use of two uniaxial quarter-wave plates (so-called A plates satisfying the relation of nx>ny=nz), a birefringent layer satisfying the relation of nx=ny>nz, and a birefringent layer satisfying the relation of nx>nz>ny.
[Patent Document 1]
Japanese Kokai Publication No. 2002-40428
[Patent Document 2]
Japanese Kokai Publication No. 2009-37049
[Patent Document 3]
Japanese Kokai Publication No. 2003-207782
[Patent Document 4]
Japanese Kokai Publication No. 2003-186017
[Non-patent Document 1]
Zhibing Ge and six others, "Wide-View Circular Polarizers for Mobile Liquid Crystal Displays", IDRC08, 2008, p. 266-268

DISCLOSURE OF THE INVENTION

As a result of the inventor's studies, it was found that the methods (A), (B), and (C) still have room for improvement in viewing angle characteristics. In addition, the methods (C), (D), and (E) involve use of biaxial retardation films satisfying the relation of nx>nz>ny (0<Nz<1), which are expensive and hard to produce. In this point, there is still room for improvement in the methods (C) to (E).

The present inventor made various investigations for solving the above-mentioned problems. The present inventor noted retardation conditions of birefringent layers disposed between a pair of polarizers (first and second polarizers) disposed in cross-Nicol. Then, the inventor found that the orthogonality between the first and second polarizers in oblique directions can be maintained while the orthogonality therebetween in the front direction is maintained when a birefringent layer (I) satisfying the relation of nx>ny≧nz (satisfying Nz≧1.0) and a birefringent layer (II) satisfying the relation of nx<ny≦nz (satisfying Nz≦0.0) are properly disposed between the first and second polarizers. Then, the inventor proposes the following method (F). Further, the inventor also found that unlike the biaxial retardation film satisfying the relation of nx>nz>ny (0<Nz<1), the birefringent layers (I) and (II) can be easily produced by using materials with appropriate intrinsic birefringence. This was disclosed in Japanese Patent Application No. 2008-099526.
(F) Combination use of two quarter-wave plates, a birefringent layer (III) satisfying the relation of nx=ny>nz, a birefringent layer (I) satisfying the relation of nx>ny≧nz, and a birefringent layer (II) satisfying the relation of nx<ny≦nz.

However, as a result of the inventor's studies, it was found that in the method (F), the viewing angle characteristics are improved by setting Nz coefficients (parameter showing biaxiality) of the two quarter-wave plates to optimum values. However, it was found that the viewing angle characteristics still have room for improvement when two generalized biaxial quarter-wave plates satisfying the relation of nx>ny≧nz (Nz≧1.0) are used.

The present invention is devised considering the aforementioned situations. An object of the present invention is to provide an LCD device that can be easily produced and has a higher contrast ratio in a wide viewing angle range.

The present inventors made various investigations on CPVA-LCD devices that can be easily produced and have a high contrast ratio in a wide viewing angle range, and then noted retardation conditions of birefringent layers disposed between a pair of polarizers (first and second polarizers) disposed in cross-Nicol. Then, the inventors found that light leakage in a black state is decreased and a high contrast ratio can be provided in a wide viewing angle range when generalized biaxial quarter-wave plates satisfying the relation of nx>ny≧nz (herein, "birefringent layer satisfying the relation of nx>ny≧nz" is defined as a birefringent layer (I)) are used as two quarter-wave plates needed for CPVA mode (first and second quarter-wave plates) and Nz coefficients thereof are adjusted to be substantially equal to each other, and further a birefringent layer satisfying the relation of nx<ny≦nz (herein, "birefringent layer satisfying the relation of nx<ny≦nz is defined as a birefringent layer (II)) is disposed between the first quarter-wave plate and the first polarizer, and between the second quarter-wave plate and the second polarizer. Further, the inventor also found that unlike the biaxial retardation film satisfying the relation of nx>nz>ny (0<Nz<1), the birefringent layers (I) and (II) can be easily produced by using materials with appropriate intrinsic birefringence.

In addition, the inventors found that the factor of preventing a complete black screen varies depending on the azimuth, and also found that retardation compensation for multiple azimuths can be achieved by disposing a birefringent layer satisfying the relation of nx=ny>nz (herein, the "birefringent layer satisfying the relation of nx=ny>nz" is defined as a birefringent layer (III)) between the first and second quarter-wave plates. Specifically, the inventors found the following. For achieving retardation compensation for multiple azimuths, firstly, a retardation of the birefringent layer (III) is adjusted, thereby optimizing conditions for retardation compensation at an azimuth of 0°, and secondly, the first and second birefringent layers (II) are disposed to show a proper retardation, thereby optimizing conditions for retardation compensation at an azimuth of 45° without changing the optimum conditions for retardation compensation at an azimuth of 0°. When the retardation is adjusted through these procedures, light leakage in a black state in oblique viewing directions can be prevented in a wider azimuth, whereby the LCD device can show a higher contrast ratio in a wide viewing angle range in terms of both azimuth and polar angle. Further, unlike the biaxial retardation film satisfying the relation of nx>nz>fly (0<Nz<1), the birefringent layer (III) can be easily produced by using materials with appropriate intrinsic birefringence. The term "azimuth" herein means a direction in the plane parallel to the substrate surface of the LC cell and is represented by 0° to 360°. The term "polar angle"

herein means a tilt angle with respect to the normal direction of the substrate surface of the LC cell and is represented by 0° to 90°.

Thus, the present inventor admirably solved the above-mentioned problems, leading to completion of the present invention.

That is, the present invention is a liquid crystal display device, including in the following order:
a first polarizer;
a first birefringent layer (II);
a first birefringent layer (I) having an in-plane retardation adjusted to λ/4;
a liquid crystal cell including a pair of substrates facing each other and a liquid crystal layer interposed therebetween;
a second birefringent layer (I) having an Nz coefficient substantially equal to that of the first birefringent layer (I) and an in-plane retardation adjusted to λ/4;
a second birefringent layer (II) having an Nz coefficient and an in-plane retardation that are substantially equal to an Nz coefficient and an in-plane retardation of the first birefringent layer (II), respectively; and
a second polarizer, provided that the birefringent layers (I) are defined as a birefringent layer satisfying the relation of nx>ny≧nz; the birefringent layers (II) are defined as a birefringent layer satisfying the relation of nx<ny≦nz; and a birefringent layer (III) is defined as a birefringent layer satisfying the relation of nx≈ny≧nz,
wherein
the device includes at least one birefringent layer (III) disposed at least one of: between the first birefringent layer (I) and the liquid crystal cell; and between the liquid crystal cell and the second birefringent layer (I),
the first birefringent layer (I) has an in-plane slow axis forming an angle of about 45° with an absorption axis of the first polarizer,
the second birefringent layer (I) has an in-plane slow axis substantially orthogonal to the in-plane slow axis of the first birefringent layer (I),
the second polarizer has an absorption axis substantially orthogonal to the absorption axis of the first polarizer,
the first birefringent layer (II) has an in-plane fast axis substantially orthogonal to the absorption axis of the first polarizer;
the second birefringent layer (II) has an in-plane fast axis substantially orthogonal to the absorption axis of the second polarizer, and
the device displays a black screen by aligning liquid crystal molecules in the liquid crystal layer substantially vertically to the substrate surface.

The term "polarizer" herein represents an element which converts natural light into linearly polarized light and is synonymous with polarizing plate or polarizing film. The term "birefringent layer" herein represents a layer having optical anisotropy, and is synonymous with retardation film, retardation plate, optically anisotropic layer, birefringent medium, and the like. The term "birefringent layer" herein represents a layer one of magnitude of the below-mentioned in-plane retardation R and magnitude of the below-mentioned thickness-direction retardation Rth of which is 10 nm or larger, preferably 20 nm or larger. The term "birefringent layer (I)" herein represents a birefringent layer satisfying the relation of nx>ny≧nz. The term "birefringent layer (II)" herein represents a birefringent layer satisfying the relation of nx<ny≦nz. The "nx" and "ny" each represent the principal refractive index of a birefringent layer in the in-plane direction for a light beam at a wavelength of 550 nm. The "nz" represents the principal refractive index thereof in the out-of-plane direction (thickness direction) for a light beam at a wavelength of 550 nm.

The term "in-plane retardation R" herein represents an in-plane retardation (unit: nm) defined by R=|nx−ny|×d, where the principal refractive indices of a birefringent layer (including an LC cell or a quarter-wave plate) in the in-plane direction are defined as nx and ny; and the principal refractive index thereof in the out-of-plane direction (in the thickness direction) is defined as nz, and the thickness of the birefringent layer is defined as d. The term "thickness-direction retardation Rth" herein represents an out-of-plane (thickness-direction) retardation (unit: nm) defined by Rth=(nz−(nx+ny)/2)×d. The term "quarter-wave plate" herein represents an optically-anisotropic birefringent layer that retards at least a light beam at a wavelength of 550 nm by about ¼ wavelength (exactly 137.5 nm, but larger than 115 nm and smaller than 160 nm), and is synonymous with λ/4 retardation film or λ/4 retardation plate.

The term "in-plane slow axis (fast axis)" herein represents a direction (x-axis or y-axis direction) of dielectric axis corresponding to a principal refractive index ns (nf), where the larger of the in-plane principal refractive indices nx and ny is redefined as ns and the smaller as nf. The term "Nz coefficient" represents a parameter showing a degree of biaxiality of a birefringent layer, defined by Nz=(ns−nz)/(ns−nf). The wavelength for the measurements of the principal refractive index, the retardation, and the like optical characteristics herein is 550 nm unless otherwise mentioned. Even in the case of birefringent layers having the same Nz coefficient, a difference in the average refractive indix (nx+ny+nz)/3 of the birefringent layers causes a difference in effective retardations of the birefringent layers to incident light from oblique directions due to refractive angles. Thus, the design principle becomes complicated. In order to avoid this problem, the average refractive index of each birefringent layer is herein standardized to 1.5 for Nz coefficient calculation, unless otherwise mentioned. For the birefringent layer having an actual average refractive index of not 1.5, the value is converted assuming that the average refractive index is 1.5. The below-mentioned thickness-direction retardation Rth is also standardized in the same manner.

In this description, when the first birefringent layer (I) has an Nz coefficient substantially equal to that of the second birefringent layer (I), a difference in the Nz coefficient is smaller than 0.1, preferably smaller than 0.05; when the first birefringent layer (II) has an Nz coefficient substantially equal to that of the second birefringent layer (II), a difference in the Nz coefficient is smaller than 0.1, preferably smaller than 0.05; and when the first birefringent layer (II) has an in-plane retardation substantially equal to that of the second birefringent layer (II), a difference in the in-plane retardation is smaller than 20 nm, preferably smaller than 10 nm.

When the first birefringent layer (I) has an in-plane slow axis forming an angle of about 45° with an absorption axis of the first polarizer, the angle is 40° to 50°, particularly preferably 45°. Even if a relative angle made by the in-plane slow axis of the first birefringent layer (I) and the absorption axis of the first polarizer is not just 45°, the effect of preventing light leakage in the normal direction of the substrate face can be sufficiently obtained because the in-plane slow axis of the first birefringent layer (I) is orthogonal to that of the second birefringent layer (I). Further, marked effects in anti-reflection or in transmittance improvement can be obtained when the above-mentioned relative angle is 45°. When the second birefringent layer (I) has an in-plane slow axis substantially orthogonal to the in-plane slow axis of the first birefringent layer (I), the angle made by the two in-plane slow axes is 88° to 92°, particularly preferably 90°. When the second polarizer has an absorption axis substantially orthogonal to the absorption axis of the first polarizer, the angle made by the two absorption axes is 88° to 92°, particularly preferably 90°. When the first birefringent layer (II) has an in-plane fast axis substantially orthogonal to the absorption axis of the first polarizer, the angle made by the two axes is 88° to 92°, particularly preferably 90°. When the second birefringent layer (II) has an in-plane fast axis substantially orthogonal to the absorption axis of the second polarizer, the angle made by the two axes is 88° to 92°, particularly preferably 90°.

The LCD device of the present invention may or may not other components as long as it essentially includes the first polarizer, the first birefringent layer (II), the first birefringent layer (I), the LC cell, the second birefringent layer (I), the second birefringent layer (II), the second polarizer, and the birefringent layer (III). In order to surely achieve the below-mentioned conversion of the polarization state of a light beam used for display according to the present invention, preferable embodiments include one in which the LCD device does not include a birefringent layer between the first and second polarizers, other than the first birefringent layer (II), the first birefringent layer (I), the LC cell, the second birefringent layer (I), the second birefringent layer (II), and the birefringent layer (III). In order to lower production costs by reducing the number of the birefringent layers to be used in the LCD device, more preferable embodiments include one in which the LCD device does not include a birefringent medium in the liquid crystal display device, other than the first polarizer, the first birefringent layer (II), the first birefringent layer (I), the LC cell, the second birefringent layer (I), the second birefringent layer (II), the second polarizer, and the birefringent layer (III). However, the LCD device may include any birefringent medium other than the first polarizer, the first birefringent layer (II), the first birefringent layer (I), the LC cell, the second birefringent layer (I), the second birefringent layer (II), the second polarizer, and the birefringent layer (III). For example, the LCD device may include a half-wave plate having an in-plane retardation of $\lambda/2$ for adjustment of wavelength dispersion of the birefringent layer and the like.

Further, the birefringent layer (III) is preferably disposed adjacent to the LC cell. The phrase "disposed adjacent to" herein means that no birefringent medium is disposed between the birefringent layer (III) and the LC cell. In one embodiment, for example, an isotropic film may be disposed between the birefringent layer (III) and the LC cell. If a plurality of the birefringent layers (III) is disposed, at least one of the birefringent layers (III) is disposed adjacent to the LC cell, and the respective birefringent layers (III) are disposed adjacent to one another.

The nx≈ny in the birefringent layer (III) is, in other words, |nx−ny|≈0, and specifically represents the case where an in-plane retardation R=|nx−ny|×d is smaller than 20 nm, preferably smaller than 10 nm. The birefringent layer (III) may have a multi-layer or single-layer structure. Regardless of the number of layers constituting the birefringent layer (III), the characteristics of the transmissive light intensity of the LCD device are completely the same in principle as long as the birefringent layer (III) is disposed on the inner side (the LC cell side) of the first and second quarter-wave plates and the sum of the thickness-direction retardations of the birefringent layers (III) is fixed. Accordingly, in this description, the present invention is simply mentioned with reference to only LCD device including one birefringent layer (III) between the second quarter-wave plate and the LC cell unless otherwise specified.

Typically, a PVA (polyvinyl alcohol) film with a dichroic anisotropic material such as an iodine complex adsorbed and aligned thereon may be employed as the polarizer. Usually, a protective film such as a triacetyl cellulose (TAC) film is laminated on the respective sides of the PVA film to secure mechanical strength, moisture resistance, heat resistance, and the like, and the resulting laminated film is practically used. Unless otherwise specified, the term "polarizer" herein means the element with the polarization function alone, not including the protective films. The first and second polarizers are so designed that one constitutes a polarizer (a back-side polarizer) and the other constitutes an analyzer (a viewing-side polarizer), and regardless of which constitutes which, the characteristics of the transmissive light intensity of the LCD device are not changed at all in principle. Unless otherwise specified, the present invention is simply mentioned with reference to only an LCD device including the first polarizer as a polarizer.

The LC cell includes a pair of substrates and an LC layer interposed therebetween. The LC cell of the present invention is in a VA (vertical alignment) mode where a black screen is displayed by aligning LC molecules in the LC layer substantially vertically to the substrate surface. The VA mode includes MVA (multi-domain VA) mode, CPA (continuous pinwheel alignment) mode, PVA (patterned VA) mode, BVA (biased vertical alignment) mode, RTN (Reverse TN) mode, IPS-VA (in-plane switching-VA) mode, and the like. When the LC molecules are aligned substantially vertically to the substrate surface, the average pretilt angle of the LC molecules is 80° or larger.

The LCD device of the present invention includes, between the first and second polarizers, the first birefringent layer (I) having an in-plane retardation adjusted to $\lambda/4$ (first quarter-wave plate) and the second birefringent layer (I) having an in-plane retardation adjusted to $\lambda/4$ (second quarter-wave plate), and the first and second birefringent layers (II). In the present invention, as mentioned above, the LCD device further includes the birefringent layer (III) between the first and second polarizers. For example, a combination of the second quarter-wave plate and the second birefringent layer (II), a combination of the second quarter-wave plate and the birefringent layer (III), a combination of the first quarter-wave plate and the first birefringent layer (II), and a combination of the first quarter-wave plate and the birefringent layer (III) are each preferably a multi-layer body composed of these layers without a cohesive agent therebetween. Such a multi-layer body can be prepared by attaching films prepared by coextrusion and the like with an adhesive agent or by forming one birefringent layer constituting the multi-layer body from a polymer film, and thereon coating or transferring the other birefringent layer including a liquid crystalline material or a non-liquid crystalline material. The latter method, which involves coating or transferring, is preferably employed when the birefringent layer (III), which is often formed by coating a non-crystalline material such as polyimide or a liquid crystalline material such as a cholesteric liquid crystal, is stacked on the second quarter-wave plate or the first quarter-wave plate.

A light beam that has entered the first polarizer from the front direction is converted into a linearly-polarized light beam by the first polarizer and then passes through the first birefringent layer (II) while maintaining its polarization state, and then converted into a circularly-polarized light beam by the first quarter-wave plate and then passes through the LC cell and the birefringent layer (III) while maintaining its polarization state. Then, when passing through the second quarter-wave plate orthogonal to the first quarter-wave plate, the circularly-polarized light beam is converted again into a linearly-polarized light beam similarly to that just after passing through the first polarizer and passes through the second birefringent layer (II) while maintaining its polarization state, and finally, the linearly-polarized light beam is blocked by the second polarizer orthogonal to the first polarizer. Thus, the birefringent layers (II) and (III) are not provided in order to convert the polarization state of a light beam incident from the front direction.

The above description mentions the achievement of the black display through tracing of the change in the polarization state at the output of the respective layers, and it can be also understood as follows intuitively. Specifically, the LCD device of the present invention including the cross-Nicol polarizers can display a perfect black screen in the front direction because of the following optical compensations (1) to (4):

(1) the first and second quarter-wave plates are disposed to be orthogonal to each other between the first and second polarizers, and the retardations thereof are the same (λ/4) and so the retardation can be cancelled. Thus, the first and second quarter-wave plates are disabled; (2) Of the birefringent layers (II) disposed between the first and second polarizers, the first birefringent layer (II) has a fast axis orthogonal to the absorption axis of the first polarizer, and the second birefringent layer (II) has a fast axis orthogonal to the absorption axis of the second polarizer. Thus, the first and second birefringent layers (II) are each substantially disabled; (3) the birefringent layer (III) and the LC cell disposed between the first and second polarizers each have a retardation of zero in the front direction, and so they are substantially disabled; and (4) the first and second polarizers are disposed to be orthogonal to each other, so-called cross-Nicol polarizers.

The LCD device of the present invention can not display a perfect black screen in the oblique direction because a light beam incident from an oblique direction to the first polarizer is not blocked by the second polarizer because of the following three reasons assuming that no conversion of the polarization state attributed to the birefringent layers (II) and (III) is given. Specifically, the birefringent layers (II) and (III) are provided in order to give a conversion of the polarization state only to a light beam incident from the oblique direction, thereby compensating the viewing angle characteristics.

As mentioned above, the birefringent layers (II) and (III) of the present invention can display an excellent black screen also in the oblique direction while maintaining an excellent black state in the front direction. Therefore, the LCD device can show a higher contrast ratio in the oblique direction to provide excellent viewing angle characteristics.

Below mentioned are the three reasons why the viewing angle compensation is provided by converting the polymerization state of a light beam incident from an oblique direction by the birefringent layers (II) and (III). This is mentioned with reference to a CPVA LCD device 100 having the simplest configuration as shown in FIG. 1, in which a first polarizer 110 (absorption axis azimuth of 90°), a first quarter-wave plate 120 (slow axis azimuth of 135°), a VA LC cell 130, a second quarter-wave plate 140 (slow axis azimuth of 45°), a second polarizer 150 (absorption axis azimuth of 0°), and not including the birefringent layers (II) and (III). In FIG. 1, the arrow shown in each of the first and second polarizers 110 and 150 represents an azimuth of the absorption axis thereof, and the arrow shown in each of the first and second quarter-wave plates 120 and 140 represents an azimuth of the slow axis thereof. The ellipsoidal body illustrated in the VA LC cell 130 shows the shape of the refractive index ellipsoidal body of the cell 130.

First, with respect to a black screen in the front direction, a light beam that has entered the first polarizer 110 from the front direction is converted into a linearly-polarized light beam by the first polarizer 110 and then further converted into a circularly-polarized light beam by the first quarter-wave plate 120, and then passes through the LC cell 130 while maintaining its polarization state. Then when passing through the second quarter-wave plate 140 orthogonal to the first quarter-wave plate 120, the circularly-polarized light beam is reconverted into the same linearly-polarized light beam as just at the output of the first polarizer 110, and finally, the linearly-polarized light beam is blocked by the second polarizer 150, which is orthogonal to the first polarizer 110. Thus, an excellent black screen is displayed. In other words, the LCD device 100 can display a perfect black screen in the front direction because (1) the first and second quarter-wave plates 120 and 140 are disposed to be orthogonal to each other between the first and second polarizers 110 and 150, and the retardations thereof are the same (λ/4) and so the retardation can be canceled. Thus, the first and second quarter-wave plates are disabled; (2) the LC cell 130 disposed between the first and second polarizers 110 and 150 has a retardation of zero in the front direction, and so it is substantially disabled; and (3) the first and second polarizers 110 and 150 are disposed to be orthogonal to each other, so-called cross-Nicol polarizers.

Then, with respect to a black screen in an oblique direction, a perfect black screen can not be displayed because of the following factors (1) to (3) contributing to reduction in viewing angle in oblique directions:

(1) the first and second quarter-wave plates 120 and 140 are not orthogonal to each other or have different retardations. Thus the first and second quarter-wave plates 120 and 140 are enabled;

(2) the LC cell 130 does not have a retardation of zero and so is not disabled; and (3) the first and second polarizers 110 and 150 are not disposed to be orthogonal to each other, and so the cross-Nicol polarizers are not present.

The above factors (1) to (3) are mentioned in more detail below with reference to FIG. 2. Although in the front direction (the normal direction to the substrate surface) the slow axis 121 of the first quarter-wave plate 120 and the slow axis 141 of the second quarter-wave plate 140 are orthogonal to each other as schematically shown in FIG. 2(*a*), they are not orthogonal to each other in an oblique direction with an azimuth of 0°. Thus the retardation is not cancelled and so the first and second quarter-wave plates 120 and 140 are not disabled. Further, in the front direction, the slow axis 121 of the first quarter-wave plate 120 and the slow axis 141 of the second quarter-wave plate 140 are orthogonal to each other as schematically shown in FIG. 2(*b*), and meanwhile, in an oblique direction with an azimuth of 45°, they are orthogonal to each other but the retardations of the first and second quarter-wave plates 120 and 140 are not the same. Thus, the retardation is not cancelled. This is because the retardation is determined by birefringence (refractive index difference)× thickness and effective birefringence is different between in the front direction and in the oblique direction and further varies depending on the azimuth. From the same reason, the retardation of the VA LC cell 130 is zero in the front direction, but not zero in any oblique direction. Only in the front direction, both of the effective birefringence and the retardation are zero. As schematically shown in FIG. 2(*c*), although in the front direction the absorption axis 111 of the first polarizer 110 and the absorption axis 151 of the second polarizer 150 are orthogonal to each other, they are not orthogonal to each other in an oblique direction with an azimuth of 45°.

As mentioned above, the CPVA LCD device 100 having the simplest configuration can not display a perfect black screen in the oblique directions because of the three factors (1) to (3). Conversely, elimination of these factors, i.e., optical compensation allows displaying better black screen in the oblique directions. The aforementioned technologies (A) to (E) for viewing angle improvement actually involve the optical compensation for the factors. In addition, the factors (1) and (2) are usually observed together. Accordingly, the optical compensations for the respective factors (1) and (2) may be performed not separately but together.

The CPVA LCD device of the present invention is so designed to provide optical compensations for the factors (1) to (3) simultaneously based on the following design principle. Specifically, the device is so designed that firstly, a generalized biaxial quarter-wave plate (the birefringent layer (I)) satisfying the relation of $nx>ny \geq nz$ is used as the first and second quarter-wave plates and the Nz coefficients thereof are adjusted to be substantially equal to each other, and secondly, a birefringent layer (the birefringent layer (II)) satisfying the relation of $nx<ny \leq nz$ is disposed between the first quarter-wave plate and the first polarizer, and between the second quarter-wave plate and the second polarizer, and thirdly, a birefringent layer (the birefringent layer (III)) satisfying the relation of $nx=ny>nz$ is disposed between the first and second quarter-wave plates.

The following will mention the design principle of the birefringent layers of the present invention. The present inventor made various investigations on simple and effective optical compensations for the above-mentioned factors, and noted that the factor of the need for optical compensation depends on the azimuth. Then, the inventor found that as shown in the following Table 1, the optical compensation of the polarizers for the factor (3) is unnecessary at an azimuth of 0°, and that only the optical compensation of the quarter-wave plates for the factor (1) and that of the LC cell for the factor (2) suffice for the optical compensation.

TABLE 1

| | Need of optical compensation | | |
|---|---|---|---|
| Azimuth | (1)Quarter-wave plate | (2)LC cell | (3)Polarizer |
| 0° | need | need | not need |
| 45° | need | need | need |

As a result, the inventor found that the factors (1) and (2) in the oblique view direction with an azimuth of 0° are simultaneously and effectively eliminated by optimizing Nz coefficients Nzq of the first and second quarter-wave plates and a thickness-direction retardation Rlc of the LC cell based on polarization state representation on the Poincare sphere and computer simulations, and further by disposing the birefringent layer (III) satisfying the relation of $nx=ny>nz$ between the first and second quarter-wave plates and optimizing the thickness-direction retardation R3 thereof. In this description, the 1st step means this process where the Nz coefficients Nzq of the first and second quarter-wave plates, the thickness-direction retardation Rlc of the LC cell, and the thickness-direction retardation R3 of the birefringent layer (III) are optimized for optical compensation at an azimuth of 0° as mentioned above.

The inventor also found that the factors (1), (2), and (3) are simultaneously and effectively eliminated in an oblique direction with an azimuth of 45° by, after the 1st step, disposing the first birefringent layer (II) satisfying the relation of $nx<ny \leq nz$ between the first quarter-wave plate and the first polarizer to have an in-plane fast axis substantially orthogonal to the absorption axis of the first polarizer and disposing the second birefringent layer (II) satisfying the relation of $nx<ny \leq nz$ between the second quarter-wave plate and the second polarizer to have an in-plane fast axis substantially orthogonal to the absorption axis of the second polarizer, and optimizing an Nz coefficient Nz2 and an in-plane retardation R2 of the first and second birefringent layers (II). In this description, the 2nd step means this process following the 1st step, where the Nz coefficient Nz2 and the in-plane retardation R2 of the birefringent layers (II) are optimized for optical compensation at an azimuth of 45°.

The first and second birefringent layers (II), which are additionally disposed in the 2nd step, are disposed such that their in-plane fast axes are substantially orthogonal to the absorption axes of the first and second polarizers, respectively, which are adjacent to the first and second birefringent layers (II), respectively. So the optical characteristics in a direction with an azimuth of 0° are not changed at all. Thus, the optical compensation of the present invention is characterized in that the optimum state achieved in the 1st step can be maintained even after the 2nd step. This optical compensation way where the 1st and 2nd steps are completely independent from each other simplifies the design of the birefringent layers.

The following will mention the details of the optical compensation principle in each of the 1st and 2nd steps with reference to the Poincare sphere. The Poincare sphere is widely known in crystal optics as a useful approach for tracing polarization state of light propagating through a birefringent layer (for example, see "Kessyo Kogaku", written by Takasaki Hiroshi, published by Morikita Publishing Co., Ltd., 1975, p. 146 to 163).

On the Poincare sphere, right-handed polarized state is represented on the upper hemisphere; left-handed polarized state on the lower hemisphere, linear polarized state on the equator; right- and left-handed circular polarized states are on upper and lower poles, respectively. Between two polarization states symmetrical with respect to the coordinate origin of the sphere, the ellipticity angles are the same in magnitude but opposite in polarity. This shows that the two polarization states are in the orthogonal polarization state.

The effects attributed to the birefringent layer are shown on the Poincare sphere as follows. The point showing state of polarization of a light beam before propagating through a birefringent layer is rotated in the counterclockwise direction by an angle determined by $(2\pi) \times (\text{retardation})/(\text{wavelength})$ (unit: rad) around the slow axis (specifically, the point showing the slower of the two eigenmodes of vibration of a birefringent layer) (this is the same when the point is rotated in the clockwise direction around the fast axis).

The rotation center and the rotation angle in an oblique view direction are determined by the slow axis (or the fast axis) and the retardation at the viewing angle. Although not being explained in detail, these can be calculated, for example, by determining a vibrating direction in the eigenmode of vibration and a wave vector in the birefringent layer from Fresnel equation for the normal incidence. The slow axis in oblique view directions depends on a viewing angle and an Nz coefficient. The retardation in oblique view directions depends on a viewing angle, an Nz coefficient, and an in-plane retardation R (or a thickness-direction retardation Rth).

(Compensation Principle in the 1st Step)

First, the polarization state when the CPVA LCD device 100 in FIG. 1 is viewed from the front direction is mentioned. FIG. 3 is a view showing changes in the polarization state of a light beam emitted from a backlight (not shown in FIG. 1, but located below the first polarizer) under this condition, represented on S1-S2 plane of the Poincare sphere. The points in FIG. 3 show the respective polarization states at the output of the respective polarizers 110 and 150, the respective birefringent layers 120 and 140, and the LC cell 130. The points showing the respective polarization states are actually on the Poincare sphere but projected on S1-S2 plane. The point showing the polarization state is shown by "◯" and the point showing the slow (fast) axis of the birefringent layer is shown by "×".

The polarization state of the light beam just at the output of the first polarizer 110 is represented by P0 on the Poincare sphere, and P0 corresponds to E showing a polarization state the second polarizer 150 can absorb, i.e., extinction position (absorption axis azimuth) of the second polarizer 150. Then, when the light beam passes through the first quarter-wave plate 120, P0 is moved to P1 by rotation by a specific angle around the slow axis of the first quarter-wave plate 120 represented by Q1 on the Poincare sphere. The rotation is in the counterclockwise direction when the coordinate origin (the center of the Poincare sphere) is viewed from Q1.

Successively, the light beam passes through the VA LC cell 130 but does not change in its polarization state because the cell 130 has a retardation of zero in the front direction. Finally, the light beam passes through the second quarter-wave plate 140, and P1 is moved to P2 by rotation by a specific angle around the slow axis of the second quarter-wave plate 140 represented by Q2. This P2 corresponds to extinction position E of the second polarizer 150. Thus, the LCD device 100 of FIG. 1 can block the light beam from the backlight to display an excellent black screen when viewed from the front direction.

The following will mention the polarization state when the CPVA LCD device 100 of FIG. 1 is viewed from a direction with an absorption axis azimuth 0° of the second polarizer 150 and the direction inclined by an angle of 60° from the normal direction (hereinafter, also referred to as a polar angle of 60°). FIG. 4 is a view showing changes in the polarization state of a light beam emitted from a backlight under this condition, represented on S1-S2 plane of the Poincare sphere. The points in FIG. 4 show the respective polarization states at the output of the respective polarizers 110 and 150, the respective birefringent layers 120 and 140, and the LC cell 130.

The polarization state of the light beam just at the output of the first polarizer 110 is represented by P0 on the Poincare sphere and P0 corresponds to E showing a polarization state the second polarizer 150 can absorb, i.e., extinction position (absorption axis azimuth) of the second polarizer 150. Then, when the light beam passes through the first quarter-wave plate 120, P0 is moved to P1 by rotation by a specific angle around the slow axis of the first quarter-wave plate 120 represented by Q1 on the Poincare sphere. The rotation is in the counterclockwise direction when the coordinate origin is viewed from Q1.

Successively, the light beam passes through the VA LC cell 130, and P1 reaches P2 by rotation by a specific angle around the slow axis of the LC cell 130 represented by L on the Poincare sphere. The rotation is in the counterclockwise direction when the coordinate origin is viewed from L. Finally, the light beam passes through the second quarter-wave plate 140, and P2 is moved to P3 by rotation by a specific angle around the slow axis of the second quarter-wave plate 140 represented by Q2. This P3 does not correspond to extinction position E of the second polarizer 150. Thus, the LCD device 100 of FIG. 1 can not block the light beam from the backlight when viewed from the direction with an azimuth of 0° and a polar angle of 60°.

The positions of P1 to P3 in FIGS. 3 and 4 depend on the Nz coefficients Nzq of the first and second quarter-wave plates 120 and 140 and the thickness-direction retardation Rlc of the LC cell 130. FIGS. 3 and 4 show, as an example, the embodiment where Nzq=1.6 and Rlc=320 nm are satisfied. For simply showing the conversion of the polarization state, the positions of the respective points are roughly shown and might not be strictly accurate. For ease illustration, the arrows showing the locus of P1-P3 conversion are not shown. The retardation Rlc of the VA LC cell 130 is typically about 320 nm, and usually adjusted to a value ranging from 270 nm to 400 nm. For example, the retardation Rlc is required to be larger than 320 nm in order to increase the transmittance. The Nz coefficient Nzq of each of the first and second quarter-wave plates 120 and 140 is usually adjusted to a value ranging from 1.0 to 2.9.

The following will mention a CPVA LCD device 200 including the birefringent layer (III) as shown in FIG. 5, in which a first polarizer 210 (absorption axis azimuth of 90°), a first quarter-wave plate 220 (slow axis azimuth of 135°), a VA LC cell 230, a birefringent layer (III) 235, a second quarter-wave plate 240 (slow axis azimuth of 45°), and a second polarizer 250 (absorption axis azimuth of 0°) are stacked in this order. In FIG. 5, the arrow shown in each of the first and second polarizers 210 and 250 represents an azimuth of the absorption axis thereof, and the arrow shown in each of the first and second quarter-wave plates 220 and 240 represents an azimuth of the slow axis thereof. The ellipsoidal bodies in the VA LC cell 230 and the birefringent layer (III) 235 show the shape of the respective refractive index ellipsoidal bodies thereof.

First, mentioned is the polarization state when the CPVA LCD device 200 in FIG. 5 is viewed from the front direction. FIG. 6 is a view showing changes in the polarization state of a light beam emitted from a backlight (not shown in FIG. 5, but located below the first polarizer 210) under this condition, represented on S1-S2 plane of the Poincare sphere. The points in FIG. 6 show the respective polarization states at the output of the respective polarizers 210 and 250, the respective birefringent layers 220 and 240, and the LC cell 230.

The polarization state of the light beam just at the output of the first polarizer 210 is represented by P0 on the Poincare sphere, and P0 corresponds to E showing a polarization state the second polarizer 250 can absorb, i.e., extinction position (absorption axis azimuth) of the second polarizer 250. Then, when the light beam passes through the first quarter-wave plate 220, P0 is moved to P1 by rotation by a specific angle around the slow axis of the first quarter-wave plate 220 represented by Q1 on the Poincare sphere. The rotation is in the counterclockwise direction when the coordinate origin is viewed from Q1.

Successively, the light beam passes through the VA LC cell 230 and the birefringent layer (III) 235 but does not change in its polarization state because the cell 230 and the birefringent layer (III) 235 each have a retardation of zero in the front direction. Finally, the light beam passes through the second quarter-wave plate 240, and P1 is moved to P2 by rotation by a specific angle around the slow axis of the second quarter-wave plate 240 represented by Q2. This P2 corresponds to extinction position E of the second polarizer 250. Thus, the LCD device 200 of FIG. 5 can block the light beam from the backlight to display an excellent black screen when viewed from the front direction, as in the LCD device 100 in FIG. 1.

The following will mention the polarization state when the CPVA LCD device 200 of FIG. 5 is viewed from a direction with an absorption axis azimuth 0° of the second polarizer 210 and a polar angle of 60°. FIG. 7 is a view showing changes in the polarization state of a light beam emitted from a backlight under this condition, represented on S1-S2 plane of the Poincare sphere. The points in FIG. 7 show the respective polarization states at the output of the respective polarizers 210 and 250, the respective birefringent layers 220 and 240, and the LC cell 230.

The polarization state of the light beam just at the output of the first polarizer 210 is represented by P0 on the Poincare sphere and P0 corresponds to E showing a polarization state the second polarizer 250 can absorb, i.e., extinction position (absorption axis azimuth) of the second polarizer 250. Then, when the light beam passes through the first quarter-wave plate 220, P0 reaches P1 by rotation by a specific angle around the slow axis of the first quarter-wave plate 220 represented by Q1 on the Poincare sphere. The rotation is in the counterclockwise direction when the coordinate origin is viewed from Q1.

Successively, the light beam passes through the VA LC cell 230, and P1 reaches P2 by rotation by a specific angle around the slow axis of the LC cell 230 represented by L on the Poincare sphere. The rotation is in the counterclockwise direction when the coordinate origin is viewed from L. Then, the light beam passes through the birefringent layer (III) 235, and P2 reaches P3 by rotation by a specific angle around the slow axis of the birefringent layer (III) 235, represented by R3 on the Poincare sphere. The rotation is in the counterclockwise direction when the coordinate origin is viewed from R3. Finally, the light beam passes through the second quarter-wave plate 240, and P3 is moved to P4 by rotation by a specific angle around the slow axis of the second quarter-wave plate 240 represented by Q2. This P4 corresponds to extinction position E of the second polarizer 250. Thus, the LCD device 200 of FIG. 5 can block the light beam from the backlight when viewed from the direction with an azimuth of 0° and a polar angle of 60°, as in viewing from the front direction.

The positions of P1 to P4 in FIGS. 6 and 7 depend on the Nz coefficients Nzq of the first and second quarter-wave plates 220 and 240, the thickness-direction retardation Rlc of the LC cell 230, and the thickness-direction retardation R3 of the birefringent layer (III) 235. FIGS. 6 and 7 show, as an example, the embodiment where Nzq=1.6, Rlc=320 nm, and R3=−129 nm are satisfied. For simply showing the conversion of the polarization state, the positions of the respective points are roughly shown and might not be strictly accurate. For ease of illustration, the arrows showing the locus of P1-P4 conversion are not shown.

As a result of the studies, the inventor found that the optimum retardation value R3 of the birefringent layer (III) 235 varies according to the Nz coefficient Nzq of each of the first and second quarter-wave plates 220 and 240. FIGS. 8 and 9 are views each showing changes in the polarization state when the CPVA LCD device 200 in FIG. 5 is viewed from the direction with an absorption axis azimuth 0° of the second polarizer 250 and a polar angle of 60°, represented on S1-S2 plane of the Poincare sphere. FIG. 8 shows the embodiment where Nzq=2.0, Rlc=320 nm, and R3=−61 nm are satisfied. FIG. 9 shows the embodiment where Nzq=2.35, Rlc=320 nm, and R3=0 nm are satisfied.

As shown in FIGS. 7, 8, and 9, the larger the Nz coefficient Nzq of each of the first and second quarter-wave plates 220 and 240 becomes the more symmetrical with respect to S1 axis P1 showing the polarization state just at the output of the first quarter-wave plate 220 and P2 showing the polarization state just at the output of the VA LC cell 230 become. As a result, the P2-P3 conversion magnitude required for P4 and E to correspond to each other, specifically, the magnitude of the required retardation R3 of the birefringent layer (III) 235 becomes smaller. As mentioned above, the retardation Rlc of the VA LC cell 230 is adjusted to a value ranging from 270 nm to 400 nm, and so when the Nz coefficient Nzq of each of the first and second quarter-wave plates 220 and 240 is 2.00 or smaller, there is a great need to dispose the birefringent layer (III).

Table 2 and FIG. 10 show a relationship between the Nz coefficient Nzq of each of the first and second quarter-wave plates 220 and 240 and the optimum thickness-direction retardation R3 of the birefringent layer (III) 235, based on the results determined by computer simulations. In the Poincare sphere diagram in FIGS. 7 to 9, the polarization conversion from P1 to P3 is illustrated separately into P1 to P2 conversion attributed to the thickness-direction retardation Rlc of the VA LC cell 230 and into P2 to P3 conversion attributed to the thickness-direction retardation R3 of the birefringent layer (III) 235. However, these two conversions are the same in rotation center, just opposite in rotation direction. The rotation direction is determined by a plus and minus sign of the thickness-direction retardation. The rotation angle is determined by the magnitude of the thickness-direction retardation. Accordingly, the above-mentioned two conversions can be regarded as a direct conversion P1 to P3 attributed to "the total thickness-direction retardation Rlc+R3" of the "VA LC cell 230+the birefringent layer (III) 235". In other words, regardless of the thickness-direction retardation Rlc of the VA LC cell 230, the optical characteristics are the same among the LCD devices whose Rlc+R3 are the same. Table 2 shows the optimum values Rlc+R3 calculated by computer simulations. As shown in Table 2 and FIG. 10, with respect to the relationship between Nzq and the optimum Rlc+R3, the following formula (A) gives a sufficiently close approximate value in the case of $1.0 \leq Nzq \leq 2.9$. The solid line in FIG. 10 represents the following formula (A).

$$Rlc+R3=169 \text{ nm} \times Nzq - 81 \text{ nm} \qquad (A)$$

In order to provide LC display with a high contrast ratio in a wide viewing angle, the retardation Rlc+R3, which is the sum of the thickness-direction retardation Rlc in a black state (in the absence of an applied voltage to the LC layer) of the VA LC cell 230 and the thickness-direction retardation R3 of the birefringent layer (III) 235 is most preferably the optimum value shown in Table 2 and FIG. 10. However, the value may slightly deviate from the optimum value unless the contrast ratio in oblique directions is significantly reduced. For sufficient advantageous effects of the invention, it is preferable that the retardation Rlc+R3 is within the optimum value±30 nm.

TABLE 2

| Nzq | Rlc + R3(nm) |
|---|---|
| 1.00 | 88 |
| 1.10 | 105 |
| 1.20 | 122 |
| 1.30 | 140 |
| 1.40 | 157 |
| 1.50 | 174 |
| 1.60 | 191 |
| 1.70 | 208 |

TABLE 2-continued

| Nzq | Rlc + R3(nm) |
|---|---|
| 2.00 | 259 |
| 2.30 | 309 |
| 2.40 | 325 |
| 2.50 | 342 |
| 2.90 | 406 |

(Compensation Principle in the 2nd Step)

Below mentioned is the case where the LCD device 200 of FIG. 5 after the 1st step is viewed from a direction with an azimuth (hereinafter, also referred to as an "azimuth of 45°") bisecting the absorption axis azimuth of 90° of the first polarizer 210 and the absorption axis azimuth of 0° of the second polarizer 250 and the direction inclined by 60°. As mentioned above, in the 1st step, the LCD device 200 achieves the optical compensation at an azimuth of 0° by determining the optimum values each of the thickness-direction retardation Rlc of the LC cell 230 and the thickness-direction retardation R3 of the birefringent layer (III) 235 in accordance with the Nz coefficient Nzq of each of the first and second λ/4 retarders 220 and 240. FIG. 11 is a view showing changes in the polarization state of a light beam emitted from a backlight under this condition, represented on S1-S2 plane of the Poincare sphere. The points in FIG. 11 show the respective polarization states at the output of the respective polarizers 210 and 250, the respective birefringent layers 220 and 240, and the LC cell 230.

The polarization state of the light beam just at the output of the first polarizer 210 is represented by P0 on the Poincare sphere, and P0 does not correspond to E showing a polarization state the second polarizer 250 can absorb, i.e., extinction position (absorption axis azimuth) of the second polarizer 250. This suggests that optical compensation is required in the oblique direction with an azimuth of 45° because in this direction the first and second polarizers 210 and 250 are not orthogonal to each other. When the light beam passes through the first quarter-wave plate 220, P0 is moved to P1 by rotation by a specific angle around the slow axis of the first quarter-wave plate 220 represented by Q1 on the Poincare sphere. The rotation is in the counterclockwise direction when the coordinate origin is viewed from Q1.

Successively, the light beam passes through the VA LC cell 230, and P1 is moved to P2 by rotation by a specific angle around the slow axis of the LC cell 230 represented by L on the Poincare sphere. This rotation is in the counterclockwise direction when the coordinate origin is viewed from L. Then the light beam passes through the birefringent layer (III) 235, and P2 reaches P3 by rotation by a specific angle around the slow axis of the birefringent layer (III) 235 represented by R3 on the Poincare sphere. The rotation is in the counterclockwise direction when the coordinate origin is viewed from R3. Finally, the light beam passes through the second quarter-wave plate 240, and P3 is moved to P4 by rotation by a specific angle around the slow axis of the second quarter-wave plate 240 represented by Q2. This P4 does not correspond to extinction position E of the second polarizer 250. Thus, the LCD device 200 of FIG. 5 can not block the light beam from the backlight when viewed from the oblique direction with an azimuth of 45° and a polar angle of 60°. Specifically, the optical compensation is not achieved when the LCD device 200 just having undergone the 1st step is viewed from the oblique direction with an azimuth of 45°.

The positions of P1 to P4 in FIG. 11 depend on the Nz coefficient Nzq of each of the first and second quarter-wave plates 220 and 240, the thickness-direction retardation Rlc of the LC cell 230, and the thickness-direction retardation R3 of the birefringent layer (III) 235. FIG. 11 shows, as an example, the embodiment where Nzq=1.6, Rlc=320 nm, and R3=−129 nm are satisfied. For simply showing the conversion of the polarization state, the positions of the respective points are roughly shown and might not be strictly accurate. For ease of illustration, the arrows showing the locus of P1-P4 conversion are not shown.

The following will mention a CPVA LCD device 300 including birefringent layers (II) as shown in FIG. 12, in which a first polarizer 310 (absorption axis azimuth of 90°), a first birefringent layer (II) 315 (fast axis azimuth of 0°), a first quarter-wave plate 320 (slow axis azimuth of 135°), a VA LC cell 330, a birefringent layer (III) 335, a second quarter-wave plate 340 (slow axis azimuth of 45°), a second birefringent layer (II) 345 (fast axis azimuth of 90°), and a second polarizer 350 (absorption axis azimuth of 0°) are stacked in this order. To the configuration shown in FIG. 5, the first and second birefringent layers (II) are added for optical compensation at an azimuth of 45°. In FIG. 12, the arrow shown in each of the first and second polarizers 310 and 350 represents an azimuth of the absorption axis thereof; the arrow shown in each of the first and second quarter-wave plates 320 and 340 represents an azimuth of the slow axis thereof; and the arrow shown in the first and second birefringent layers (II) 315 and 345 represents an azimuth of the fast axis thereof. The ellipsoidal bodies in the VA LC cell 330 and the birefringent layer (III) 335 show the shape of the respective refractive index ellipsoidal bodies thereof.

First, the polarization state when the CPVA LCD device 300 in FIG. 12 is viewed from the front direction is mentioned. FIG. 13 is a view showing changes in the polarization state of a light beam emitted from a backlight (not shown in FIG. 12, but located below the first polarizer 310), represented on S1-S2 plane of the Poincare sphere. The points in FIG. 13 show the respective polarization states at the output of the respective polarizers 310 and 350, the respective birefringent layers 315, 320, 340, and 345, and the LC cell 330.

The polarization state of the light beam just at the output of the first polarizer 310 is represented by P0 on the Poincare sphere, and P0 corresponds to E showing a polarization state the second polarizer 350 can absorb, i.e., extinction position (absorption axis azimuth) of the second polarizer 350. Successively, the light beam passes through the first birefringent layer (II) 315, but the polarization state thereof represented by P0 is not changed even after the rotation by a specific angle around the fast axis of the first birefringent layer (II) 315 represented by R2-1 on the Poincare sphere. Then, when the light beam passes through the first quarter-wave plate 320, P0 is moved to P1 by rotation by a specific angle around the slow axis of the first quarter-wave plate 320 represented by Q1 on the Poincare sphere. The rotation is in the counterclockwise direction when the coordinate origin is viewed from Q1.

Successively, the light beam passes through the VA LC cell 330 and the birefringent layer (III) 335 but does not change in its polarization state because the cell 330 and the birefringent layer (III) 335 each have a retardation of zero in the front direction. Then the light beam passes through the second quarter-wave plate 340, and P1 is moved to P2 by rotation by a specific angle around the slow axis of the second quarter-wave plate 340 represented by Q2. Finally, the light beam passes through the second birefringent layer (II) 345, but the polarization state thereof represented by P2 is not changed even after the rotation by a specific angle around the fast axis of the second birefringent layer (II) 345 represented by R2-2 on the Poincare sphere. This 22 corresponds to extinction position E of the second polarizer 350. Thus, the LCD device 300 of FIG. 12 can block the light beam from the backlight to display an excellent black screen when viewed from the front direction, as in the LCD device 100 of FIG. 1.

The following will mention the polarization state when the CPVA LCD device 300 of FIG. 12 is viewed from the direction with an azimuth of 45° and a polar angle of 60°. FIG. 14 is a view showing changes in the polarization state of a light beam emitted from a backlight under this condition, represented on S1-S2 plane of the Poincare sphere. The points in FIG. 14 show the respective polarization states at the output of the respective polarizers 310 and 350, the respective birefringent layers 315, 320, 340, and 345, and the LC cell 330.

The polarization state just at the output of the first polarizer 310 is represented by P0 on the Poincare sphere, and P0 does not correspond to E showing a polarization state the second polarizer 350 can absorb, i.e., extinction position (absorption axis azimuth) of the second polarizer 350. Successively, when the light beam passes through the first birefringent layer (II) 315, P0 is moved to P1 by rotation by a specific angle around the fast axis of the first birefringent layer (II) 315 represented by R2-1 on the Poincare sphere. Then, when the light beam passes through the first quarter-wave plate 320, P1 is moved to P2 by rotation by a specific angle around the slow axis of the first quarter-wave plate 320 represented by Q1 on the Poincare sphere. The rotation is in the counterclockwise direction when the coordinate origin is viewed from Q1.

Successively, the light beam passes through the VA LC cell 330, and P2 is moved to P3 by rotation by a specific angle around the slow axis of the LC cell 330 represented by L on the Poincare sphere. This rotation is in the counterclockwise direction when the coordinate origin is viewed from L. Then the light beam passes through the birefringent layer (III) 335, and P3 reaches P4 by rotation by a specific angle around the slow axis of the birefringent layer (III) 335 represented by R3 on the Poincare sphere. The rotation is in the counterclockwise direction when the coordinate origin is viewed from R3. Successively, the light beam passes through the second quarter-wave plate 340, and P4 reaches P5 by rotation by a specific angle around the slow axis of the second quarter-wave plate 340 represented by Q2. Finally, the light beam passes through the second birefringent layer (II) 345, and P5 is moved to P6 by rotation by a specific angle around the fast axis of the second birefringent layer (II) 345 represented by R2-2 on the Poincare sphere. The rotation is in the clockwise direction when the coordinate origin is viewed from R2-2. This P6 corresponds to extinction position E of the second polarizer 350. Thus, the LCD device 300 of FIG. 12 can block the light beam from the backlight when viewed from the oblique direction with an azimuth of 45° and a polar angle of 60°, similarly in the front direction.

Finally, mentioned is the case where the CPVA LCD device 300 of FIG. 12 is viewed from the oblique direction with an azimuth of 0° and a polar angle of 60°. FIG. 15 is a view showing changes in the polarization state of a light beam emitted from a backlight under this condition, represented on S1-S2 plane of the Poincare sphere. The points in FIG. 15 show the respective polarization states at the output of the respective polarizers 310 and 350, the respective birefringent layers 315, 320, 340, and 345, and the LC cell 330.

The polarization state of the light beam just at the output of the first polarizer 310 is represented by P0 on the Poincare sphere and P0 corresponds to E showing a polarization state the second polarizer 350 can absorb, i.e., extinction position (absorption axis azimuth) of the second polarizer 350. Successively, the light beam passes through the first birefringent layer (II) 315, but the polarization state thereof represented by P0 is not changed even after the rotation by a specific angle around the fast axis of the first birefringent (II) 315 represented by R2-1 on the Poincare sphere. Then, when the light beam passes through the first quarter-wave plate 320, P0 reaches P1 by rotation by a specific angle around the slow axis of the first quarter-wave plate 320 represented by Q1 on the Poincare sphere. The rotation is in the counterclockwise direction when the coordinate origin is viewed from Q1.

Successively, the light beam passes through the VA LC cell 330, and P1 reaches P2 by rotation by a specific angle around the slow axis of the LC cell 330, represented by L on the Poincare sphere. The rotation is in the counterclockwise direction when the coordinate origin is viewed from L. Then, the light beam passes through the birefringent layer (III) 335, and P2 reaches P3 by rotation by a specific angle around the slow axis of the birefringent layer (III) 335, represented by R3 on the Poincare sphere. The rotation is in the counterclockwise direction when the coordinate origin is viewed from R3. Then the light beam passes through the second quarter-wave plate 340, and P3 reaches P4 by rotation by a specific angle around the slow axis of the second quarter-wave plate 340, represented by Q2. Finally, the light beam passes through the second birefringent layer (II) 345, but the polarization state represented by P4 is not changed even after the rotation by a specific angle around the fast axis of the second birefringent layer (II) 345 represented by R2-2 on the Poincare sphere. This P4 corresponds to extinction position E of the second polarizer 350. Thus, the LCD device 300 of FIG. 12 can block the light beam from the backlight to display an excellent black screen when viewed from the oblique direction with an azimuth of 0° and a polar angle of 60°, similarly in the front direction.

Thus, the LCD device 300 in FIG. 12 having undergone the 2nd step can block the light beam from the backlight to display an excellent black screen in each of the front direction, the oblique direction with an azimuth of 0°, and the oblique direction with an azimuth of 45°.

The positions of P1 to P6 in FIGS. 13, 14, and 15 depend on the Nz coefficient Nzq of each of the first and second quarter-wave plates 320 and 340, the thickness-direction retardation Rlc of the LC cell 330, the thickness-direction retardation R3 of the birefringent layer (III) 335, and the Nz coefficient Nz2 and the in-plane retardation R2 of each of the first and second birefringent layers (II) 315 and 345. FIGS. 13, 14, and 15 show, as an example, the embodiment where Nzq=2.0, Rlc=320 nm, R3=−61 nm, Nz2=−0.05, and R2=89 nm are satisfied. For simply showing the conversion of the polarization state, the positions of the respective points are roughly shown and might not be strictly accurate. For ease of illustration, the arrows showing the locus of P1-P6 conversion are not shown.

The inventor's studies revealed that the Nz coefficient Nz2 and the retardation R2 that are optimum for each of the first and second birefringent layers (II) 315 and 345 vary depending on the Nz coefficient Nzq of each of the first and second quarter-wave plates 320 and 340. FIG. 16 is a view showing changes in the polarization state when the CPVA LCD device 300 in FIG. 12 is viewed from the oblique direction with an absorption axis azimuth 45° of the second polarizer 350 and a polar angle of 60°, represented on S1-S2 plane of the Poincare sphere. FIG. 16 shows the embodiment where Nzq=2.35, Rlc=320 nm, R3=0 nm, Nz2=−0.37, and R2=73 nm are satisfied.

Table 3 and FIGS. 17 and 18 show a relationship between the Nz coefficients Nzq of the first and second quarter-wave plates 320 and 340, and the optimum values of the Nz coefficient Nz2 and the in-plane retardation R2 of each of the first and second birefringent layers (II) 315 and 345, based on the results determined by computer simulations. As shown in Table 3 and FIGS. 17 and 18, the relationship between Nzq, and the optimum Nz2 and R2 is not simple typically, but in the case of $1.0 \leqq Nzq \leqq 2.9$, the following (B) and (C) give a sufficiently close approximation to Nz2 and R2, respectively, which are shown by solid lines in FIGS. 17 and 18.

$$Nz2 = -0.87 \times Nzq^2 + 2.15 \times Nzq - 0.76 \quad (B)$$

$$R2 = 25\ nm \times Nzq^2 - 159\ nm \times Nzq + 311\ nm \quad (C)$$

The values Nz2 and R2 of the first and second birefringent layers (II) 315 and 345 are most preferably the optimum values shown in Table 3 and FIGS. 17 and 18, respectively, in order to provide LC display with a high contrast ratio in a wide viewing angle range. However, the values may slightly deviate from the respective optimum values unless the contrast ratio in oblique directions is significantly reduced. For sufficient advantageous effects of the invention, the Nz coefficient Nz2 is preferably within the optimum value±0.45. The in-plane retardation R2 is preferably within the optimum value±40 nm.

As shown in Table 3 and FIG. 17, in the case of Nzq<2.00, the optimum value Nz2 is in a range of 0<Nz2<1. The birefringent layer having the Nz coefficient satisfying this range is a biaxial retardation film satisfying nx>nz>ny. Accordingly, such a layer does not correspond to the birefringent layer (II) and is an expensive film that is harder to produce than the birefringent layer (II) is. In view of this, the present inventor made various investigations on a simple and cost-effective method of providing LC display with a high contrast ratio in a wide viewing angle range in the case of Nzq<2.00. As a result, in the case of Nzq<2.00, use of the birefringent layers (II) satisfying Nz2=0, instead of the birefringent layer satisfying the optimum values Nz2 and R2 shown in Table 3 and FIGS. 17 and 18, permits effective improvements in viewing angle characteristics so long as a biaxial retardation film satisfying nx>nz>ny (0<Nz<1) is not used. The optimum R2 corresponding to each Nzq is shown as R2' in Table 3 and FIG. 19. In order to sufficiently exhibit the advantageous effects of the present invention, it is preferable that $-0.45 \leqq Nz2 \leqq 0$ and $5\ nm \leqq R2' \leqq 133\ nm$ (within the optimum value±40 nm) are satisfied.

TABLE 3

| Nzq | Nz2 | R2(nm) | R2'(nm) |
| --- | --- | --- | --- |
| 1.0 | 0.65 | 180 | 45 |
| 1.1 | 0.60 | 162 | 53 |
| 1.2 | 0.60 | 158 | 60 |
| 1.3 | 0.55 | 147 | 65 |
| 1.4 | 0.50 | 138 | 71 |
| 1.5 | 0.40 | 123 | 75 |
| 1.6 | 0.35 | 118 | 80 |
| 1.7 | 0.25 | 108 | 84 |
| 2.0 | −0.05 | 89 | 93 |
| 2.3 | −0.40 | 77 | |
| 2.4 | −0.55 | 73 | |
| 2.5 | −0.70 | 69 | |
| 2.6 | −0.80 | 68 | |
| 2.7 | −1.00 | 64 | |
| 2.8 | −1.40 | 59 | |
| 2.9 | −2.45 | 49 | |

The respective embodiments mentioned above may be appropriately employed in a combination without departing from the spirit and scope of the invention.

Effect of the Invention

The LCD device of the present invention can be easily produced and has a high contrast ratio in a wide viewing angle range. Such an LCD device of the present invention can be preferably used in display devices such as outdoor signage displays.

BRIEF DESCRIPTION OF THE DRAWINGS

FIG. 2(*b*) is a schematic view showing slow axes of the first and second quarter-wave plates that are orthogonal to each other in the front direction when viewed in the front direction (the upper view); and also is a schematic view showing that when viewed in an oblique direction with an azimuth of 45° (the lower view).

FIG. 2(*c*) is a schematic view showing absorption axes of the first and second polarizers that are orthogonal to each other in the front direction when viewed in the front direction (the upper view); and is a schematic view showing that when viewed in an oblique direction with an azimuth of 45° (the lower view).

Figure 1:
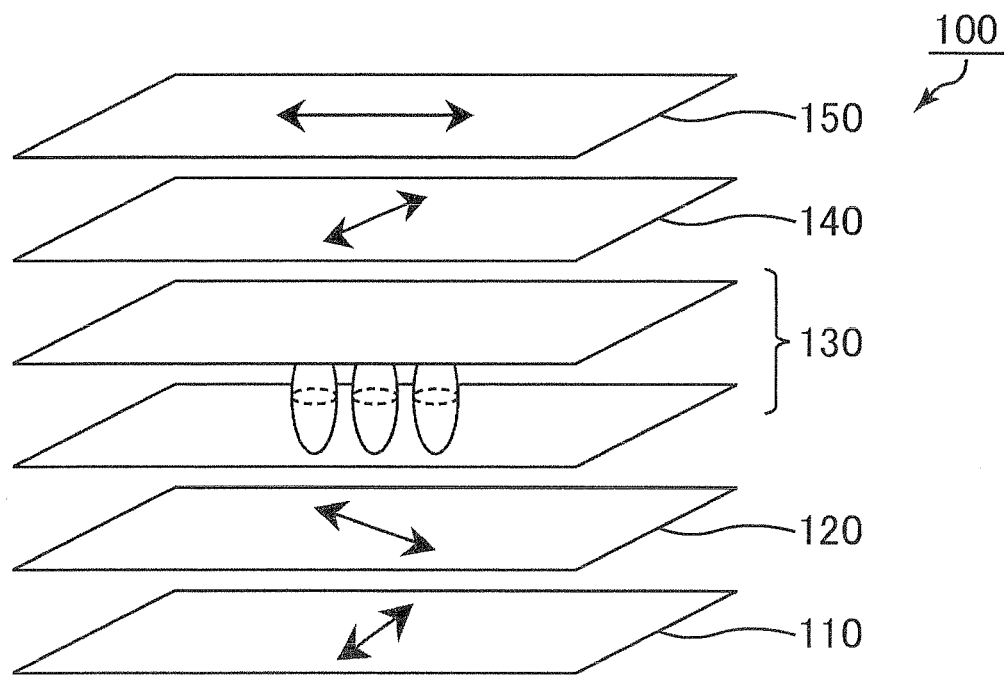
FIG. 1 is an exploded perspective view showing a configuration of a CPVA LCD device having the simplest configuration, not including birefringent layers (II) and (III).
Figure 2:
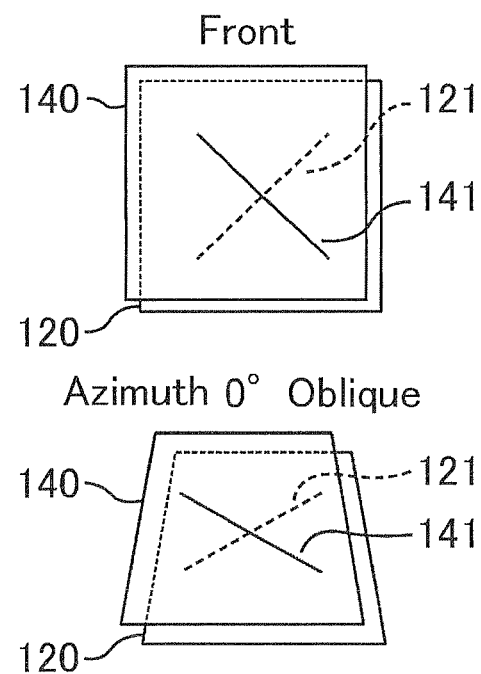
FIG. 2(*a*) is a schematic view showing slow axes of first and second quarter-wave plates that are orthogonal to each other in the front direction when viewed in the front direction (the upper view); and also is a schematic view showing that when viewed in an oblique direction with an azimuth of 0° (the lower view).
Figure 2:
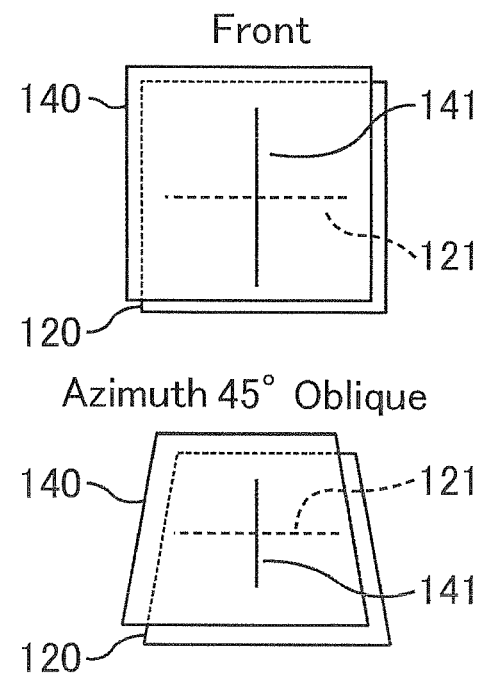
Figure 2:
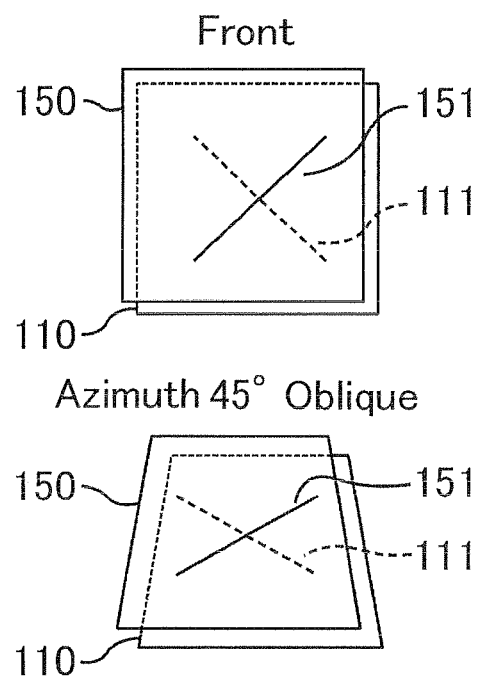
Figure 3:
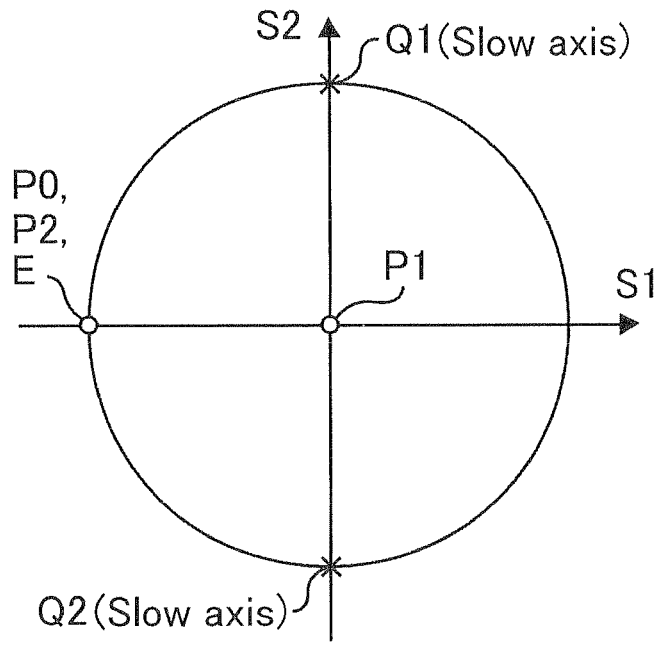
FIG. 3 is a view showing changes in polarization state of a transmissive light beam at the output of the respective members in the case where the CPVA LCD device in FIG. 1 is viewed in the front direction, represented on S1-S2 plane of the Poincare sphere.
Figure 4:
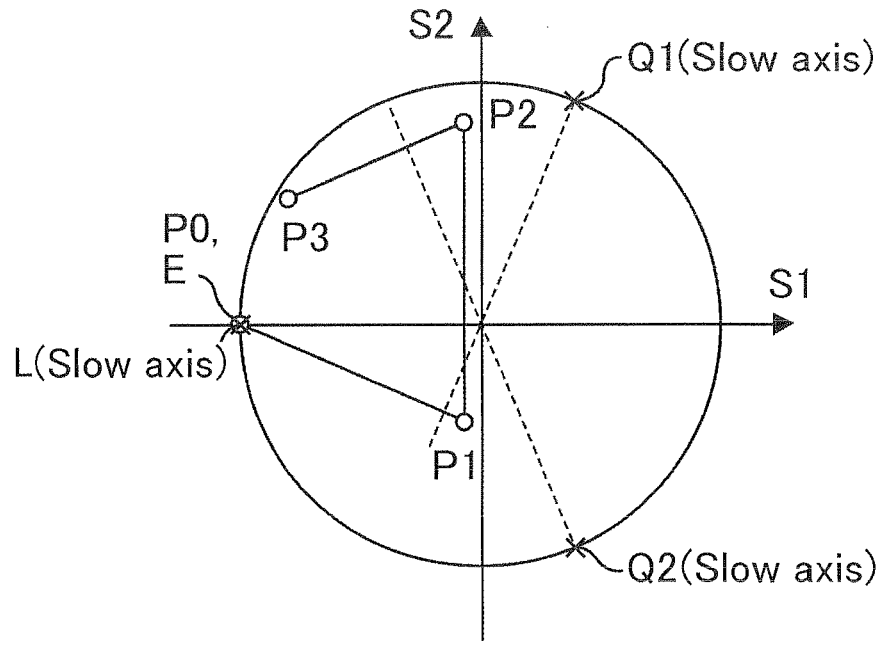
FIG. 4 is a view showing changes in polarization state of a transmissive light beam at the output of the respective members in the case where the CPVA LCD device in FIG. 1 is viewed in the oblique direction with an azimuth of 0° and a polar angle of 60°, represented on S1-S2 plane of the Poincare sphere.
Figure 5:
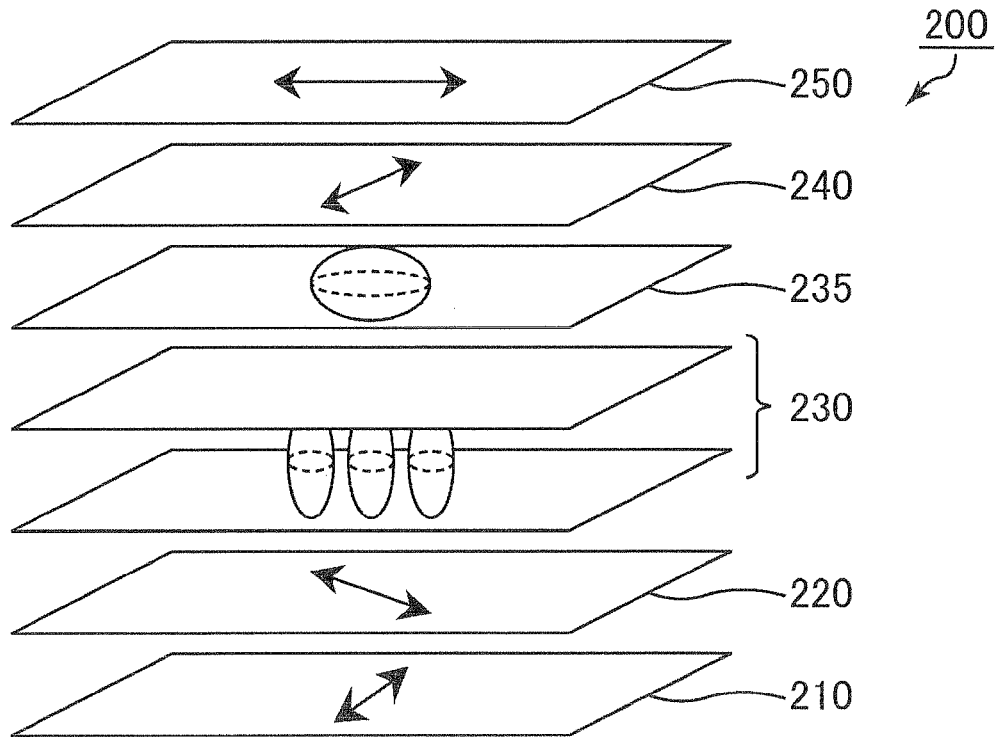
FIG. 5 is an exploded perspective view showing a configuration of a CPVA LCD device including a birefringent layer (III).
Figure 6:
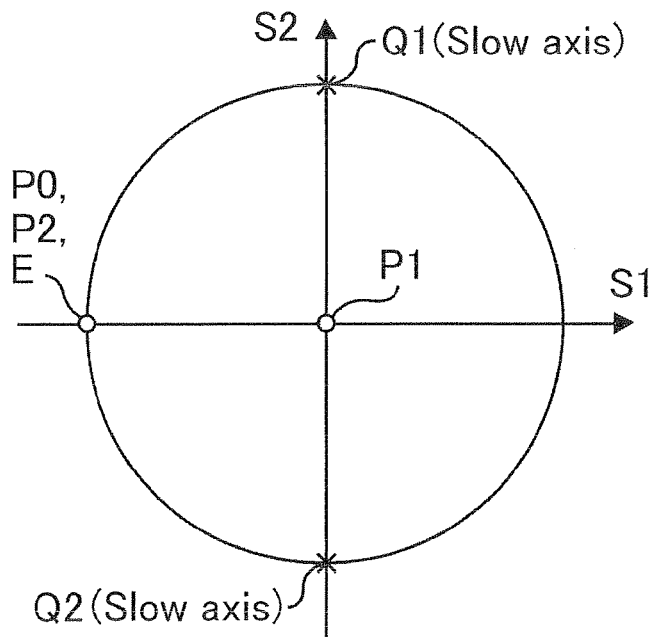
FIG. 6 is a view showing changes in polarization state of a transmissive light beam at the output of the respective members in the case where the CPVA LCD device in FIG. 5 (Nzq=1.6, Rlc=320 nm, R3=−129 nm) is viewed from the front direction, represented on S1-S2 plane of the Poincare sphere.
Figure 7:
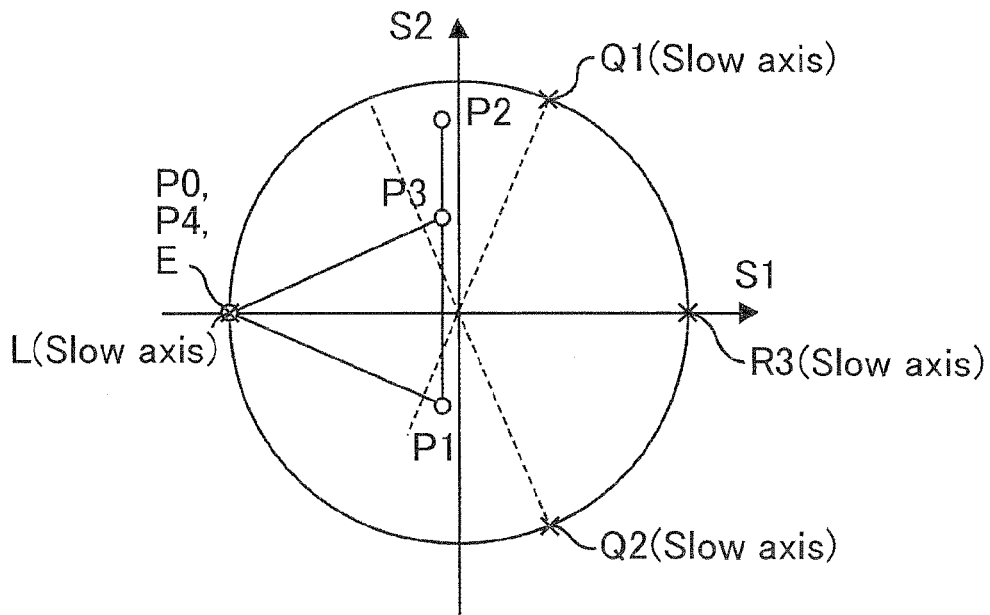
FIG. 7 is a view showing changes in polarization state of a transmissive light beam at the output of the respective members in the case where the CPVA LCD device in FIG. 5 (Nzq=1.6, Rlc=320 nm, R3=−129 nm) is viewed from the oblique direction with an azimuth of 0° and a polar angle of 60°, represented on S1-S2 plane of the Poincare sphere.
Figure 8:
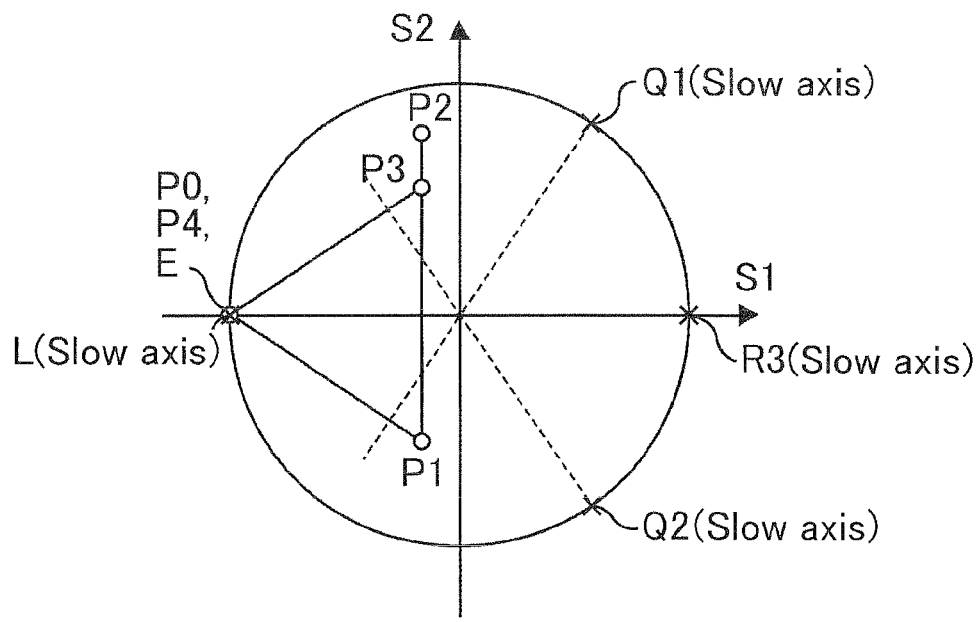
FIG. 8 is a view showing changes in polarization state of a transmissive light beam at the output of the respective members in the case where the CPVA LCD device in FIG. 5 (Nzq=2.0, Rlc=320 nm, R3=−61 nm) is viewed from the oblique direction with an azimuth of 0° and a polar angle of 60°, represented on S1-S2 plane of the Poincare sphere.
Figure 9:
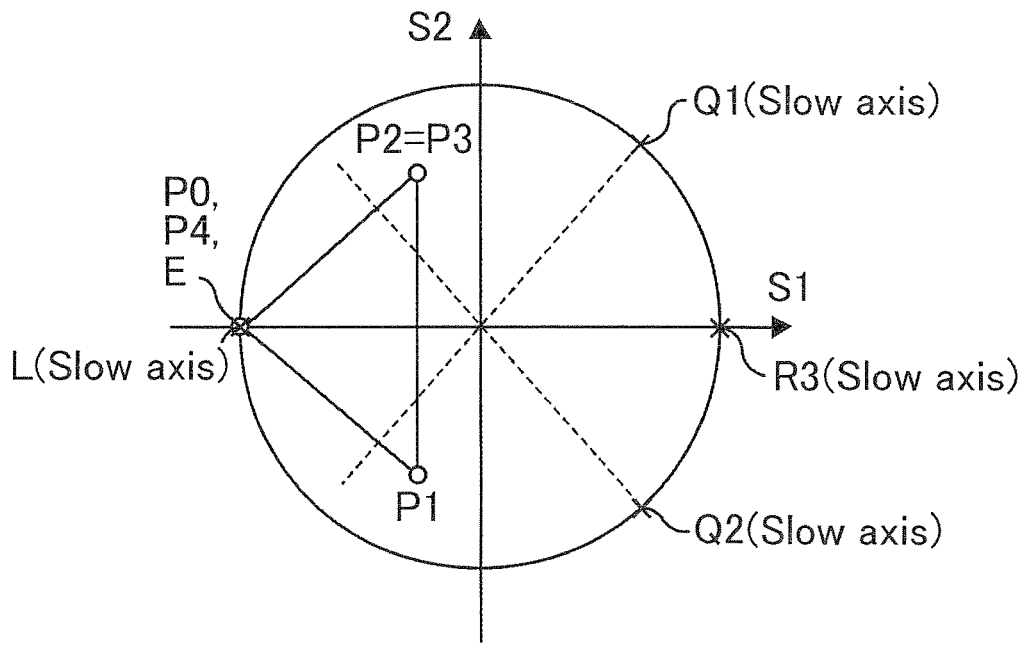
FIG. 9 is a view showing changes in polarization state of a transmissive light beam at the output of the respective members in the case where the CPVA LCD device in FIG. 5 (Nzq=2.35, Rlc=320 nm, R3=−61 nm) is viewed from the oblique direction with an azimuth of 0° and a polar angle of 60°, represented on S1-S2 plane of the Poincare sphere.
Figure 10:
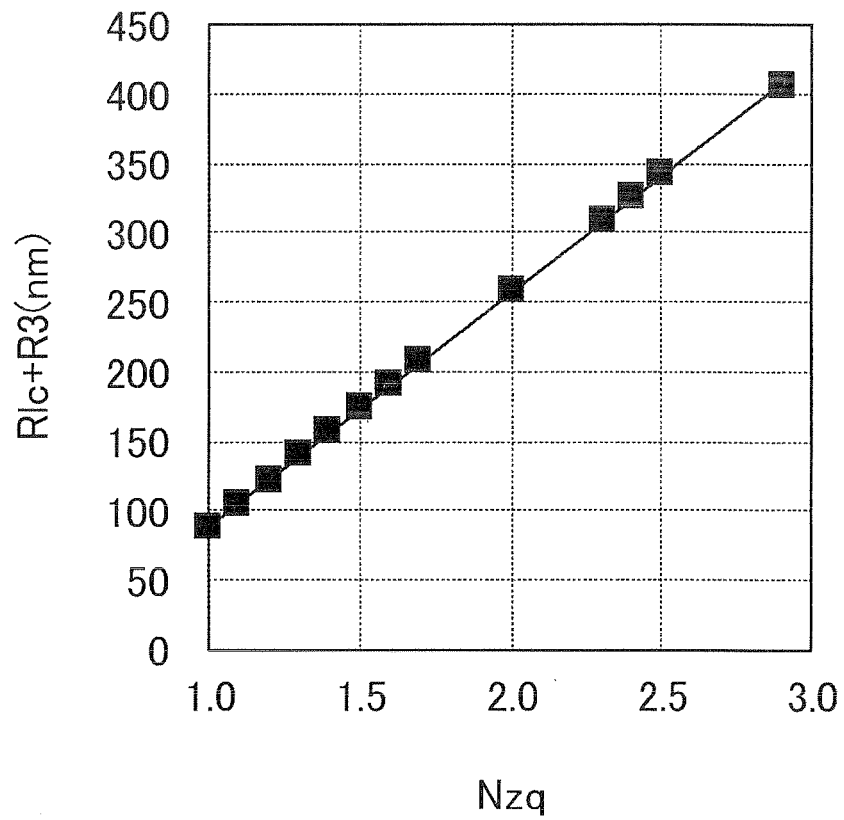
FIG. 10 is a graph showing a relationship between an Nz coefficient Nzq of each of first and second quarter-wave plates and an optimum thickness-direction retardation R3 of a birefringent layer (III) in the CPVA LCD device in FIG. 5.
Figure 11:
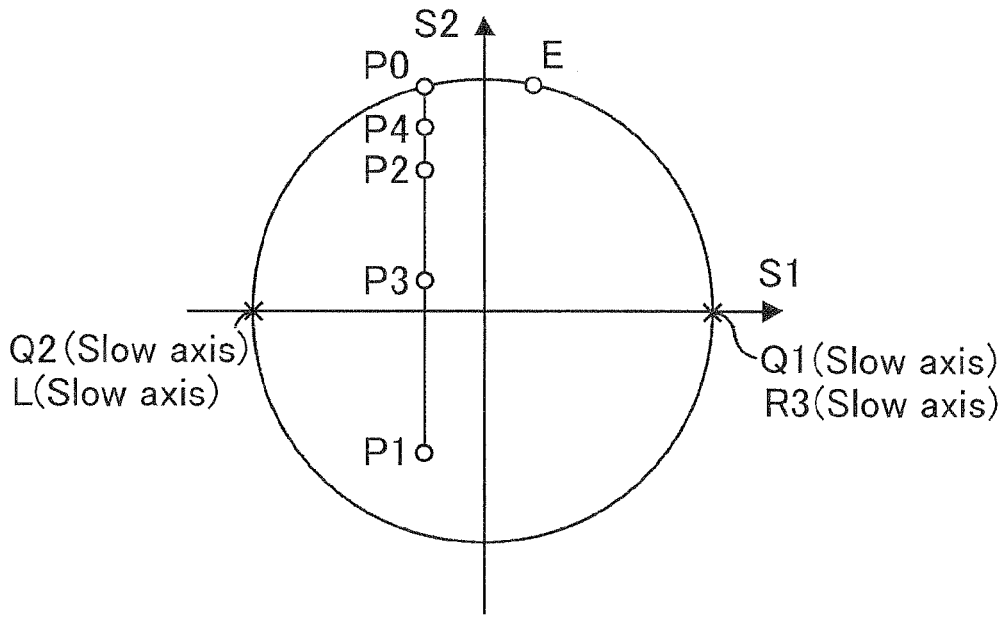
FIG. 11 is a view showing changes in polarization state of a transmissive light beam at the output of the respective members in the case where the CPVA LCD device in FIG. 5 is viewed from the oblique direction with an azimuth of 45° and a polar angle of 60°, represented on S1-S2 plane of the Poincare sphere.

BEST MODE FOR CARRYING OUT THE INVENTION (Birefringent Layer)

With respect to the birefringent layers used in the present invention, materials and optical characteristics thereof are not especially limited. Examples of the materials include thin plates made of inorganic materials, stretched polymer films, and ones in which alignment of liquid crystalline molecules is fixed. The method for forming the birefringent layers is not especially limited. The polymer films may be formed by solvent cast, melt extrusion, and the like. Alternatively, coextrusion may be employed to form a plurality of birefringent layers at a time. The polymer films may or may not be stretched as long as desired retardations can be exhibited. The stretching method is not especially limited. The polymer films may be stretched under tension between rolls, compressed and stretched between rolls, uniaxially stretched in a transverse direction with a tenter, stretched in an oblique direction, or biaxially stretched in longitudinal and transverse directions. Alternatively, the polymer films may be stretched under the influence of contractile force of a thermo-shrinkable film. Particularly for the quarter-wave plate, the oblique stretching is preferably employed in which a material for the quarter-wave plate is stretched in a direction oblique to a feeding direction of a roll film because the quarter-wave plate is stacked on a polarizer so as to form a relative angle of about 45° with the polarizer to serve as a circular polarizer. When a liquid crystalline material is used to form the birefringent layers, for example, the liquid crystalline material is applied on a base film with an alignment treatment-provided surface, and thereby fixing alignment of the liquid crystalline material. The base film may not be provided with the alignment treatment or the coating may be separated from the base film after the alignment fixing to be transferred onto another film as long as the desired retardations are exhibited.

Alternatively, the alignment of the LC materials may not be fixed. The same methods as in use of the liquid crystalline materials may be employed when non-crystalline materials are used to form the birefringent layers. The following will in more detail describe the birefringent layers classified by types.

(Birefringent Layer (I): First and Second Quarter-Wave Plates)

As the birefringent layer (I), for example, materials formed by stretching a film containing a component with positive intrinsic birefringence may be appropriately used. Examples of the component with positive intrinsic birefringence include polycarbonate, polysulfone, polyether sulfone, polyethylene terephthalate, polyethylene, polyvinyl alcohol, norbornene, triacetyl cellulose, and diatyl cellulose.

(Birefringent Layer (II))

The birefringent layer (II) may include, for example, a material formed by stretching a film containing a component with negative intrinsic birefringence and one formed by stretching a film containing a component with positive intrinsic birefringence under the influence of contractile force of a thermo-shrinkable film. For simplification of the production method, one formed by stretching a film containing a component with negative intrinsic birefringence is preferable. Examples of the component with negative intrinsic birefringence include resin compositions containing an acrylic resin and a styrene resin, polystyrene, polyvinyl naphthalene, polyvinyl biphenyl, polyvinyl pyridine, polymethyl methacrylate, polymethyl acrylate, an N-substituted maleimide copolymer, fluorene skeleton-containing polycarbonate, and triacetyl cellulose (particularly with a small acetylation degree). In view of optical characteristics, productivity, and heat resistance, resin compositions containing an acrylic resin and a styrene resin are particularly preferable as the component with negative intrinsic birefringence. For example, Japanese Kokai Publication No. 2008-146003 discloses a production method of a film containing such a resin composition.

(Birefringent Layer (III))

The birefringent layer (III) may include a material formed by stretching in longitudinal and transverse directions a film containing a component with positive intrinsic birefringence, one coated with a liquid crystalline compound e.g. a cholesteric (chiral nematic) liquid crystal and a discotic liquid crystal, and one coated with a non-liquid crystalline compound including polyimide, polyamide, and the like.

(Polarizer)

The polarizers may include a polyvinyl alcohol (PVA) film with a dichroic anisotropic material such as an iodine complex adsorbed and aligned thereon.

(LC Cell)

The LC cell is not especially limited as long as it can display a black screen by aligning LC molecules in the LC cell vertically to the substrate surface, and VA LC cells may be employed, for example. Examples of the VA LC cells include MVA, CPA, PVA, BVA, RTN, and IPS-VA cells. Examples of a driving system of the LC cell include TFT system (active matrix system), passive matrix system, and plasma address system. The LC cell has a configuration, for example, in which an LC layer is disposed between a pair of substrates each provided with electrodes and display is provided by voltage application between the electrodes.

(Method for Measuring R, Rth, Nz Coefficient, nx, ny, and nz)

R, Rth, Nz coefficient, nx, ny, and nz were measured with a dual-rotating retarder polarimeter (Axo-scan, Axometrics, Inc.). In-plane retardation R was measured from the normal direction of the birefringent layer. Principal refractive indices nx, ny, and nz, thickness-direction retardation Rth, and Nz coefficient were calculated by curve fitting with a known index ellipsoid. For the calculation, retardations of the birefringent layer were measured from the normal direction and the directions each with a polar angle of −50° to 50° from the normal direction. Azimuths of the inclinations each were made orthogonal to the in-plane slow axis. nx, ny, nz, Rxz and Nz depend on the average refractive index=(nx+ny+nz)/3, which is given as the condition for the curve fitting calculation. Here, the average refractive index of each birefringent layer was set to 1.5. Even in the case of the birefringent layer having an actual average refractive index of not 1.5, the average refractive index was converted into 1.5.

(Method for Measuring Viewing Angle Dependence of Contrast of LCD Device)

The viewing angle dependence of contrast was measured with a viewing angle measuring apparatus (EZContrast 160, ELDIM). The light source was a backlight mounted on a LC TV (LC37-GH1, SHARP Corp.). Brightnesses upon displaying a white screen and a black screen were measured in the oblique direction with an azimuth of 45° and a polar angle of 60°. The ratio thereof was regarded as CR (45, 60). Brightnesses upon displaying a white screen and a black screen were measured in the oblique direction with an azimuth of 0° and a polar angle of 60°. The ratio thereof was regarded as CR (0, 60).

The present invention is mentioned in more detail with reference to embodiments, but not limited thereto.

Figure 12:
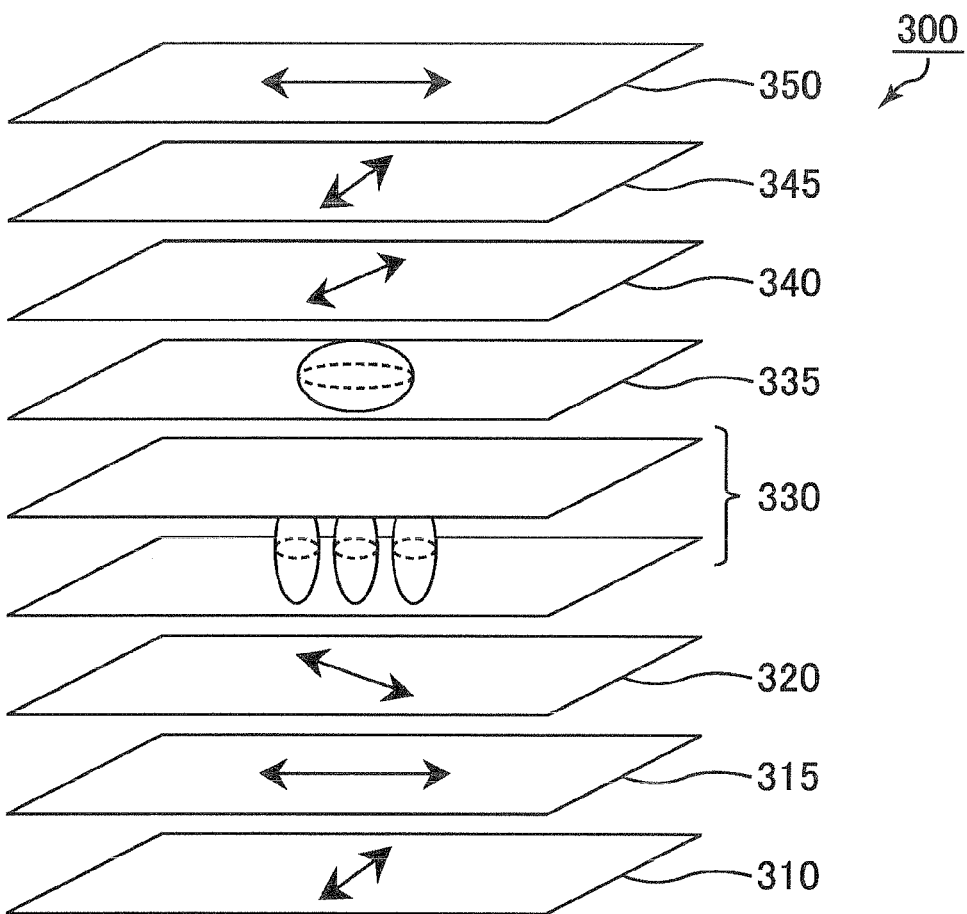
FIG. 12 is an exploded perspective view showing a CPVA LCD device including birefringent layers (II) and (III).
Figure 13:
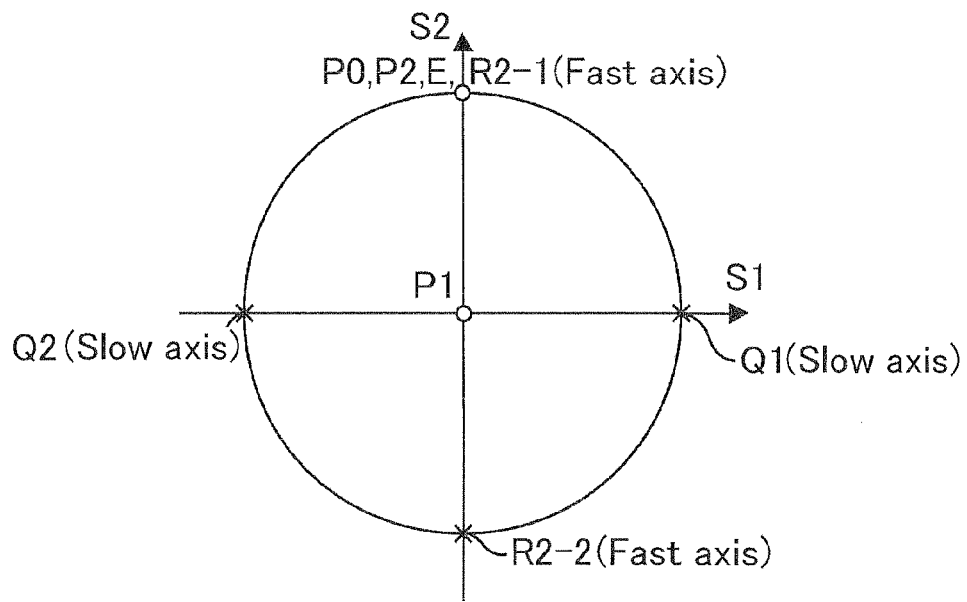
FIG. 13 is a view showing changes in polarization state of a transmissive light beam at the output of the respective members in the case where the CPVA LCD device in FIG. 12 (Nzq=1.6, Rlc=320 nm, R3=−129 nm, Nz2=−0.30, R2=118 nm) is viewed from the front direction, represented on S1-S2 plane of the Poincare sphere.
Figure 14:
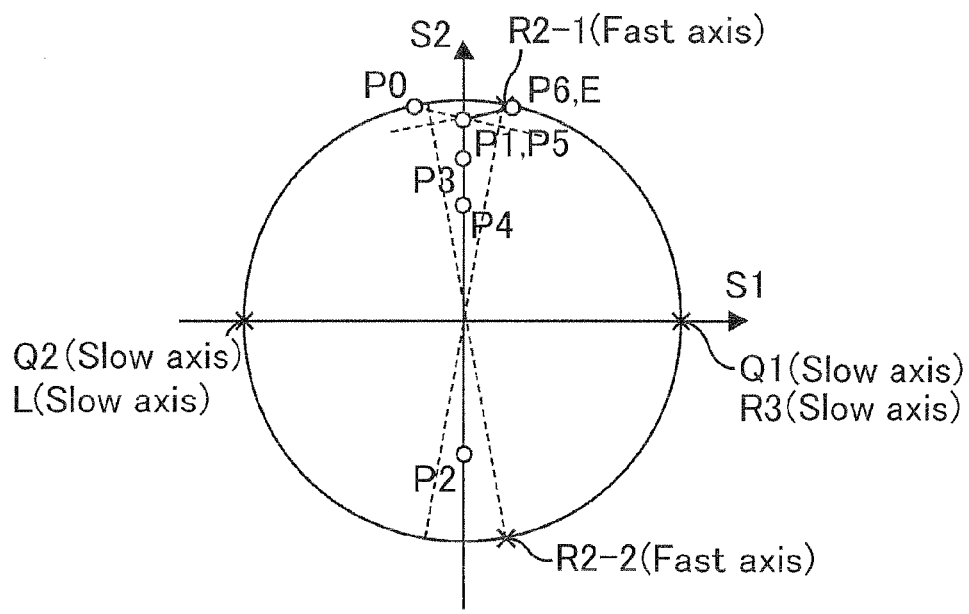
FIG. 14 is a view showing changes in polarization state of a transmissive light beam at the output of the respective members in the case where the CPVA LCD device in FIG. 12 (Nzq=1.6, Rlc=320 nm, R3=−129 nm, Nz2=−0.30, R2=118 nm) is viewed from the oblique direction with an azimuth of 45° and a polar angle of 60°, represented on S1-S2
Figure 15:
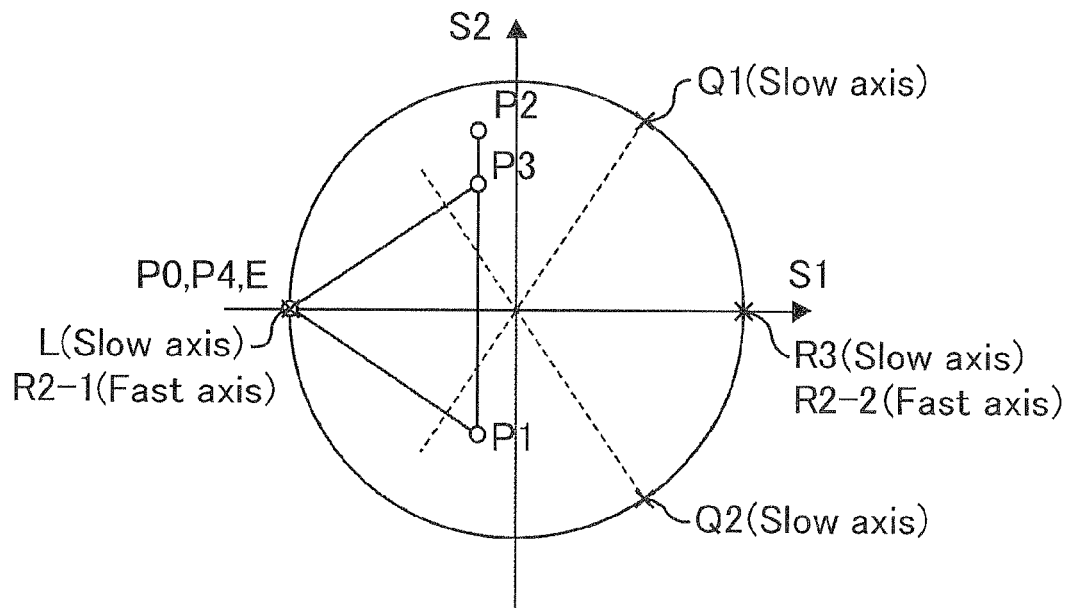
FIG. 15 is a view showing changes in polarization state of a transmissive light beam at the output of the respective members in the case where the CPVA LCD device in FIG. 12 (Nzq=1.6, Rlc=320 nm, R3=−129 nm, Nz2=−0.30, R2=118 nm) is viewed from the oblique direction with an azimuth of 0° and a polar angle of 60°, represented on S1-S2 plane of the Poincare sphere.
Figure 16:
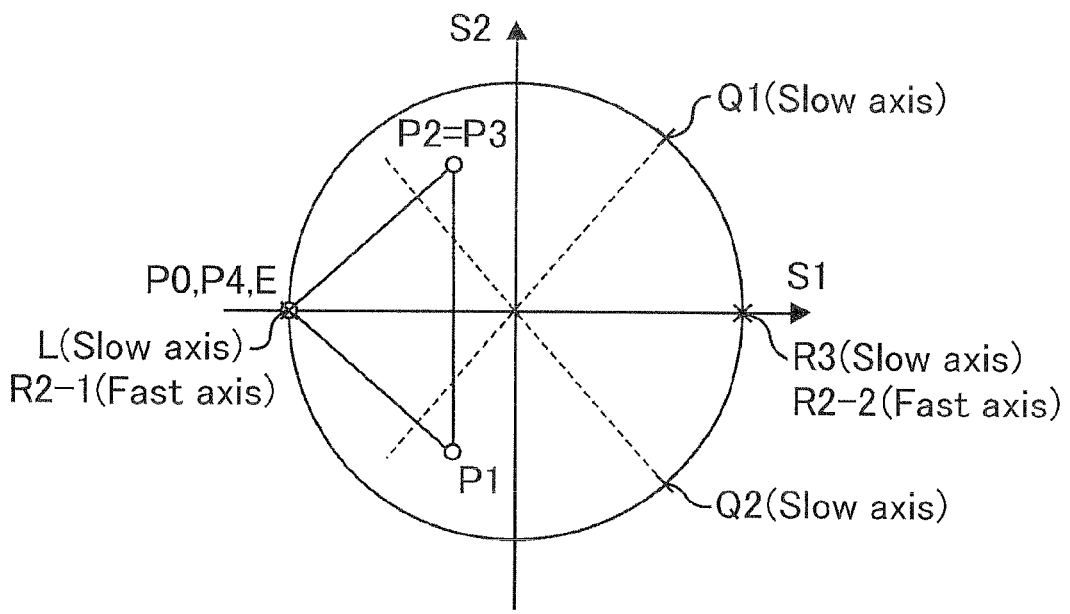
FIG. 16 is a view showing changes in polarization state of a transmissive light beam at the output of the respective members in the case where the CPVA LCD device in FIG. 12 (Nzq=2.35, Rlc=320 nm, R3=0 nm, Nz2=−0.37, R2=73 nm) is viewed from the oblique direction with an azimuth of 45° and a polar angle of 60°, represented on S1-S2 plane of the Poincare sphere.
Figure 17:
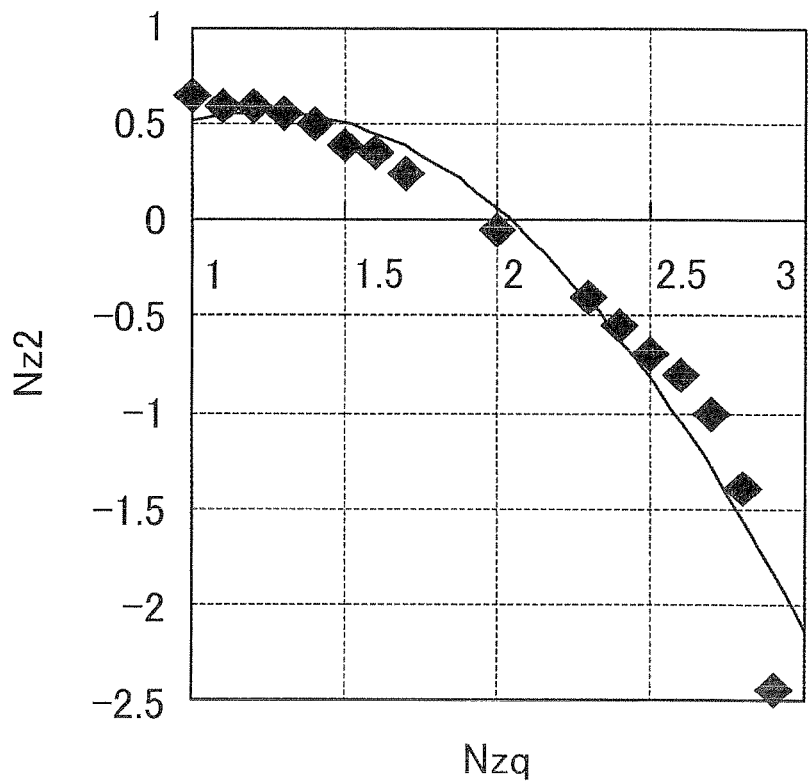
FIG. 17 is a graph showing a relationship between an Nz coefficient Nzq of each of first and second quarter-wave plates and an optimum Nz coefficient Nz2 of each of first and second birefringent layers (II) in the CPVA LCD device in FIG. 12.
Figure 18:
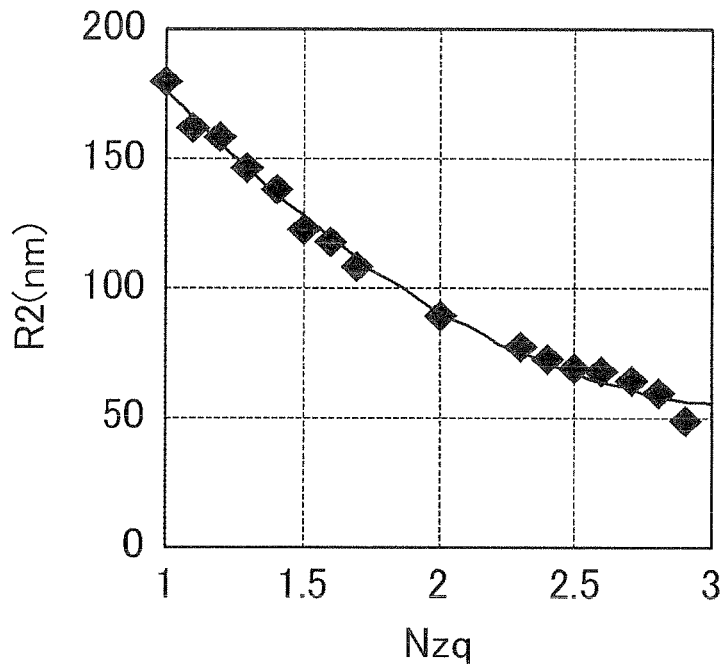
FIG. 18 is a graph showing a relationship between an Nz coefficient Nzq of each of first and second quarter-wave plates and an optimum in-plane retardation R2 of each of first and second birefringent layers (II) in the CPVA LCD device in FIG. 12.
Figure 19:
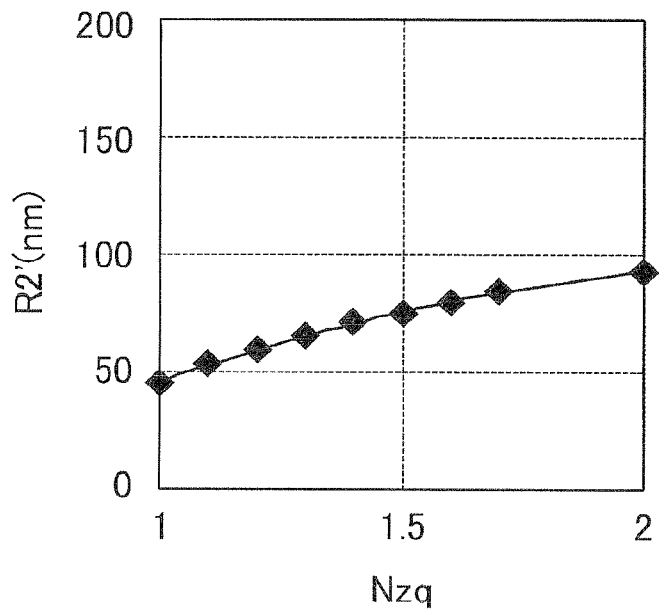
FIG. 19 is a graph showing a relationship between an Nz coefficient Nzq of each of first and second quarter-wave plates and an optimum in-plane retardation R2 of first and second birefringent layers (II) in the CPVA LCD device in FIG. 12 when the birefringent layer (II) of Nz2=0 is used in the case of Nzq<2.00.

The LCD devices in embodiments 1 to 4 of the present invention are a CPVA LCD device 300 in which as shown in FIG. 12, a first polarizer 310, a first birefringent layer (II) 315, a first quarter-wave plate (birefringent layer (I)) 320, a VA LC cell 330, a birefringent layer (III) 335, a second quarter-wave plate 340, a second birefringent layer (II) 345, and a second polarizer 350 are stacked in this order. In FIG. 12, the arrow in each of the first and second polarizers 310 and 350 shows an azimuth of the absorption axis thereof; the arrow in each of the first and second quarter-wave plates 320 and 340 shows an azimuth of the slow axis thereof; the arrow in each of the first and second birefringent layer (II) 315 and 345 shows an azimuth of the fast axis thereof; and the ellipsoidal body in the VA LC cell 330 and the birefringent layer (III) 335 shows the shape of the refractive index ellipsoidal body thereof.

The LCD device of comparative embodiment 1 is a VA LCD device in which a first polarizer, a TAC film, a first quarter-wave plate (birefringent layer (I)), a VA LC cell, a second quarter-wave plate, a TAC film, and a second polarizer are stacked in this order. The LCD device of comparative embodiment 2 is a VA LCD device in which a first polarizer, a TAC film, a first quarter-wave plate (birefringent layer (I)), a VA LC cell, a birefringent layer (III), a second quarter-wave plate, a TAC film, and a second polarizer are stacked in this order.

The material name, axis angle, in-plane retardation R, thickness-direction retardation Rth or Rlc, and Nz coefficient of the polarizers, the birefringent layers, and the LC cell of the respective embodiments are as shown in the following Table 4 (embodiments 1 to 4) and Table 5 (comparative embodiments 1 and 2). In Tables, the axis of each of the birefringent layers is defined by an azimuth angle of the in-plane slow axis, and the axis of each of the polarizers is defined by an azimuth angle of the absorption axis. With respect to the birefringent layer (II), the design of the in-plane fast axis is important, and in Tables, the axis of the birefringent layer (II) is defined by an azimuth angle of the in-plane slow axis, as in other birefringent layers. The in-plane fast axis of the birefringent layer (II) is orthogonal to the in-plane slow axis of the birefringent layer (II). In Tables, the name of the materials of the respective birefringent layers is indicated by means of the following abbreviations.

NB: norbornene

TAC: triacetyl cellulose

A: resin composition containing acrylic resin and styrene resin (Evaluation Results)

The viewing angle dependence of contrast ratio of the LCD device was determined in each embodiment, and the CR (0, 60) and the CR (45, 60) are shown in Tables 4 and 5.

The LCD device in each of embodiments 1 to 4 according to the present invention had a CR (0, 60) and a CR (45, 60) that are much higher than those in the LCD device in each of comparative embodiments 1 and 2. Even in the visual evaluation, the LCD devices of embodiments 1 to 4 each had a contrast ratio on the viewing angle that is much superior to that in the LCD devices of comparative embodiments 1 and 2.

TABLE 4

| | | | Axis | Retardation [nm] | | | Evaluation results | |
| --- | --- | --- | --- | --- | --- | --- | --- | --- |
| | Optical component | Material name | angle [°] | R | Rth or Rlc | Nz coefficient | CR (45, 60) | CR (0, 60) |
| Embodiment 1 | Second polarizer | | 0 | | | | 63 | 162 |
| | Second birefringent layer (II) | A | 0 | 90 | | −0.02 | | |

TABLE 4-continued

|  | Optical component | Material name | Axis angle [°] | Retardation [nm] R | Rth or Rlc | Nz coefficient | Evaluation results CR (45, 60) | CR (0, 60) |
|---|---|---|---|---|---|---|---|---|
|  | Second quarter-wave plate | NB | 45 | 138 |  | 2.01 |  |  |
|  | Birefringent layer (III) | NB |  | 2 | −70 |  |  |  |
|  | VA liquid crystal cell |  |  |  | 320 |  |  |  |
|  | First quarter-wave plate | NB | 135 | 138 |  | 2.01 |  |  |
|  | First birefringent layer (II) |  | 90 | 90 |  | −0.02 |  |  |
|  | First polarizer |  | 90 |  |  |  |  |  |
| Embodiment 2 | Second polarizer |  | 0 |  |  |  | 60 | 176 |
|  | Second birefringent layer (II) | A | 0 | 85 |  | −0.10 |  |  |
|  | Second quarter-wave plate | NB | 45 | 138 |  | 2.13 |  |  |
|  | Birefringent layer (III) | TAC |  | 2 | −52 |  |  |  |
|  | VA liquid crystal cell |  |  |  | 320 |  |  |  |
|  | First quarter-wave plate | NB | 135 | 138 |  | 2.13 |  |  |
|  | First birefringent layer (II) |  | 90 | 85 |  | −0.10 |  |  |
|  | First polarizer |  | 90 |  |  |  |  |  |
| Embodiment 3 | Second polarizer |  | 0 |  |  |  | 62 | 178 |
|  | Second birefringent layer (II) | A | 0 | 80 |  | −0.28 |  |  |
|  | Second quarter-wave plate | NB | 45 | 138 |  | 2.21 |  |  |
|  | Birefringent layer (III) | NB |  | 2 | −30 |  |  |  |
|  | VA liquid crystal cell |  |  |  | 320 |  |  |  |
|  | First quarter-wave plate | NB | 135 | 138 |  | 2.21 |  |  |
|  | First birefringent layer (II) |  | 90 | 80 |  | −0.28 |  |  |
|  | First polarizer |  | 90 |  |  |  |  |  |
| Embodiment 4 | Second polarizer |  | 0 |  |  |  | 62 | 176 |
|  | Second birefringent layer (II) | A | 0 | 73 |  | −0.44 |  |  |
|  | Second quarter-wave plate | NB | 45 | 138 |  | 2.32 |  |  |
|  | Birefringent layer (III) | NB |  | 2 | −10 |  |  |  |
|  | VA liquid crystal cell |  |  |  | 320 |  |  |  |
|  | First quarter-wave plate | NB | 135 | 138 |  | 2.32 |  |  |
|  | First birefringent layer (II) |  | 90 | 73 |  | −0.44 |  |  |
|  | First polarizer |  | 90 |  |  |  |  |  |

TABLE 5

|  | Optical components | Material name | Axis angle [°] | Retardation [nm] R | Rth or Rlc | Nz coefficient | Evaluation results CR (45, 60) | CR (0, 60) |
|---|---|---|---|---|---|---|---|---|
| Comparative Embodiment 1 | Second polarizer |  | −20 |  |  |  | 5 | 40 |
|  | TAC | TAC |  | 1 | 32 |  |  |  |
|  | Second quater-wave plate | NB | 25 | 138 |  | 1.58 |  |  |
|  | VA liquid crystal cell |  |  |  | 320 |  |  |  |
|  | First quarter-wave plate | NB | 115 | 138 |  | 1.58 |  |  |
|  | TAC | TAC |  | 1 | 32 |  |  |  |
|  | First polarizer |  | 70 |  |  |  |  |  |
| Comparative Embodiment 2 | Second polarizer |  | 0 |  |  |  | 15 | 140 |
|  | TAC | TAC |  | 1 | 32 |  |  |  |
|  | Second quarter-wave plate | A | 45 | 138 | −8 | −0.01 |  |  |
|  | Birefringent layer (III) | NB |  | 2 | 318 |  |  |  |
|  | VA liquid crystal cell |  |  |  | 320 |  |  |  |
|  | First quarter-wave plate | NB | 135 | 138 |  | 1.02 |  |  |
|  | TAC | TAC |  | 1 | 32 |  |  |  |
|  | First polarizer |  | 90 |  |  |  |  |  |

The LCD device in each of embodiments includes a circularly-polarizing plate composed of a linearly-polarizing plate (second polarizer) and a quarter-wave plate on each side of the LC cell to provide display in CPVA mode. The CPVA mode is effective in improvement of contrast ratio because the anti-reflection effects can be obtained in addition to the transmittance-improvement effects. According to the anti-reflection in the CPVA mode, the circularly-polarizing plates inhibit a light beam once having entered the LCD device and then being reflected inside the device, i.e., a reflected light beam by internal reflection, from exiting the LCD device. Accordingly, in the CPVA mode, light beams reflected on black matrix, the lines, the electrodes, and the like in the LC cell hardly exit the LCD devices, and particularly in bright environments, the reduction in contrast ratio of the LCD devices can be prevented.

Examples of the reflected light beams causing a reduction in contrast ratio of the LCD devices in bright environments include a light beam that has been reflected on the surface of the LCD device without entering the device, i.e., a reflected light beam by surface reflection, in addition to the reflected light by internal reflection. According to the CPVA LCD device, the amount of the reflected light beam by the surface reflection has large effects on visibility of the display screen because the reflected light beam by internal reflection is suppressed. Accordingly, by providing the CPVA LCD device with a measure for reducing the light reflected by the surface reflection, the device can provide a very high contrast ratio in bright environments, and a viewer can realize a marked improvement in display qualities.

Figure 20:
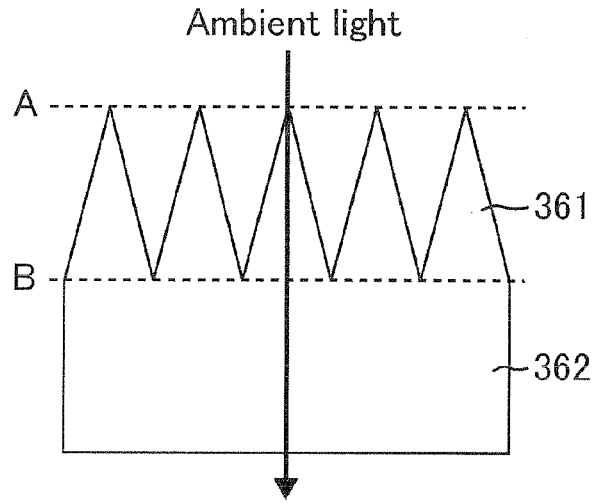
FIG. 20(a) is an enlarged view schematically showing a cross section of a moth-eye film.
FIG. 20(b) is an explanation view showing a change in refractive index on an interface between a moth-eye film and air.
Figure 20:
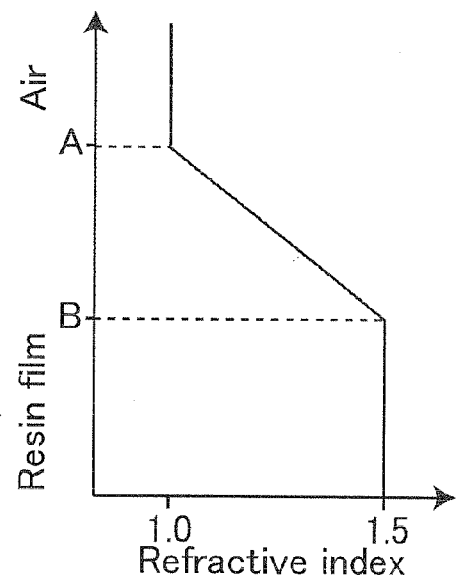

The anti-reflection film for suppression of the surface reflection includes one having a multi-layer structure composed of films with different refractive indices, and one having a surface on which fine protrusions and recesses are formed. Particularly, a "moth-eye film", which is one kind of the latter one, has a surface on which many protrusions smaller than a wavelength (380 nm to 780 nm) of a visible light beam are formed, and due to this structure, very excellent effects of suppressing the surface reflection can be exhibited. As shown in FIG. 20(a), a light beam entering the moth-eye film reaches a base material portion 362 through fine protrusions 361 formed on the surface, and so a region where both of the protrusions and air exist between air and the base material portion (A-B region in FIG. 20(a)) is regarded as a region with a refractive index intermediate between that of a material constituting the film (about 1.5 if a resin constitutes the film) and that of air (1.0). Specifically, as shown in FIG. 20(b), the refractive index in this region continuously and gradually increases with a change in volume ratio between the protrusion and air, within the distance shorter than the wavelength of the visible light beam from the refractive index of air in contact with the film surface to the refractive index of the material for the film. As a result, a light beam incident on the moth-eye film does not recognize the air-film interface as an interface of the two with different refractive indices, and reflection of the light beam on the interface can be significantly reduced. According to the moth-eye films, for example, a surface reflectance of a visible light beam can be reduced to about 0.15%.

Figure 21:
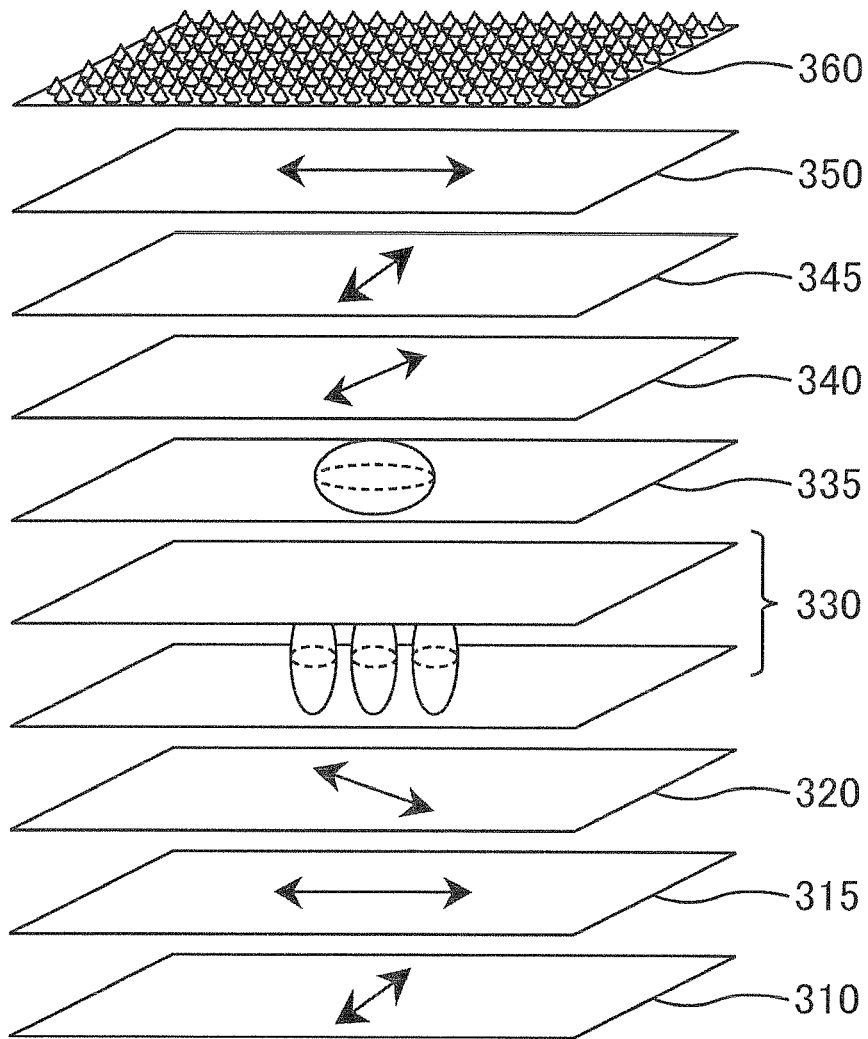
FIG. 21 is an exploded perspective view showing a configuration of the CPVA LCD device in FIG. 12 with which a moth-eye film is further provided.

The moth-eye films are disposed between two media with different refractive indices to reduce a reflectance of a light beam on the interface therebetween, but in the configuration in FIG. 12, the internal reflection occurring on the inner side of the second polarizer 350 can be suppressed by the circularly-polarizing plate composed of the second polarizer 350 and the second quarter-wave plate 340. Accordingly, when the configuration in FIG. 12 is provided with a moth-eye film, the film is disposed on the display face side of the second polarizer 350, like a moth-eye film 360 shown in FIG. 21. When members such as a protective plate are disposed and so multiple interfaces exist on the display face side of the second polarizer 350, a moth-eye film may be disposed at each interface and preferably disposed at least on the surface of the LCD device that is exposed to the outside.

Specific examples of the moth-eye film include a resin film having a surface on which many protrusions each having a substantially conical shape with a height of about 200 nm are formed with a distance between the tops of the cones being about 200 nm.

Nanoimprint technology may be employed for production of the moth-eye film. Specifically, employed may be a technology of transferring protrusions and recesses in nanometer size (1 to 1000 μm) of a mold surface to a resin material coated over a substrate. For curing the resin material in nanoimprint technology, thermal nanoimprint, UV nanoimprint, and the like, may be employed. According to the UV nanoimprint, for example, a mold is pressed against a UV-curable resin film formed on a transparent substrate, and the film is irradiated with UV light, thereby producing a thin film with moth-eye structure in the inverse shape of the mold on the transparent substrate.

Roll-to-roll process is better than batch process when nanoimprint technology is used to produce a large number of thin films with a moth-eye structure at a low cost. By use of the roll-to-roll process, thin films with a moth-eye structure can be continuously produced with a mold roller. Such a mold roller includes one having nanosized recesses formed on a polished outer circumference surface of a conical or cylindrical aluminum tube by anodization. According to anodization, the nanosized recesses can be formed in a random placement and in an almost uniform distribution, and seamless moth-eye structures preferable for continuous production can be formed on a mold roller surface.

The respective configurations in the above-mentioned embodiments may be appropriately employed in a combination without departing from the spirit and scope of the invention.

The present application claims priority to Patent Application No. 2009-127933 filed in Japan on May 27, 2009 under the Paris Convention and provisions of national law in a designated State, the entire contents of which are hereby incorporated by reference.

EXPLANATION OF NUMERALS

100: CPVA LCD device
110: First polarizer
111: Absorption axis of first polarizer
120: First quarter-wave plate
121: Slow axis of first quarter-wave plate
130: VA LC cell
140: Second quarter-wave plate
141: Slow axis of second quarter-wave plate
150: Second polarizer
151: Absorption axis of second polarizer
200: CPVA LCD device
210: First polarizer
220: First quarter-wave plate
230: VA LC cell
235: Birefringent layer (III)
240: Second quarter-wave plate
250: Second polarizer
300: CPVA LCD device
310: First polarizer
315: First birefringent layer (II)
320: First quarter-wave plate
330: VA LC cell
335: Birefringent layer (III)
340: Second quarter-wave plate
345: Second birefringent layer (II)
350: Second polarizer
360: Moth-eye film
361: Protrusion

The invention claimed is:

1. A liquid crystal display device, comprising in the following order:
 a first polarizer;
 a first birefringent layer (II);
 a first birefringent layer (I) having in-plane retardation adjusted to $\lambda/4$;
 a liquid crystal cell including a pair of substrates facing each other and a liquid crystal layer interposed therebetween:
 a second birefringent layer (I) having an Nz coefficient substantially equal to that of the first birefringent layer (I) and an in-plane retardation adjusted to $\lambda/4$;
 a second birefringent layer (II) having an Nz coefficient and an in-plane retardation that are substantially equal to an Nz coefficient and an in-plane retardation of the first birefringent layer (II), respectively; and
 a second polarizer, provided that the birefringent layers (I) are defined as a birefringent layer satisfying the relation of nx>ny≧nz; the birefringent layers (II) are defined as a birefringent layer satisfying the relation of nx<ny≦nz; and a birefringent layer (III) is defined as a birefringent layer satisfying the relation of nx≈ny≧nz, where "nx" and "ny" represent respective principal refractive indices of a layer in the in-plane direction for a light beam at a wavelength of 550 nm, and "nz" represents the principal refractive index thereof in the out-of-plane thickness direction for a light beam at a wavelength of 550 nm, wherein the device comprises at least one birefringent layer (III) disposed at least one of: between the first birefringent layer (I) and the liquid crystal cell; and between the liquid crystal cell and the second birefringent layer (I), the first birefringent layer (I) has an in-plane slow axis forming an angle of about 45° with an absorption axis of the first polarizer, the second birefringent layer (I) has an in-plane slow axis substantially orthogonal to the in-plane slow axis of the first birefringent layer (I), the second polarizer has an absorption axis substantially orthogonal to the absorption axis of the first polarizer, the first birefringent layer (II) has an in-plane fast axis substantially orthogonal to the absorption axis of the first polarizer;

the second birefringent layer (II) has an in-plane fast axis substantially orthogonal to the absorption axis of the second polarizer, the device displays a black screen by aligning liquid crystal molecules in the liquid crystal layer substantially vertically to the substrate surface, wherein the liquid crystal display device satisfies the following formulae (1) to (3):

$$1.0 \leq Nzq \leq 2.9 \tag{1}$$

$$(169 \text{ nm} \times Nzq - 81 \text{ nm}) - 30 \text{ nm} \leq Rlc + R3 \tag{2}$$

$$Rlc + R3 \leq (169 \text{ nm} \times Nzq - 81 \text{ nm}) + 30 \text{ nm} \tag{3},$$

where the Nz coefficient of each of the first and second birefringent layers (I) is defined as Nzq;

a thickness-direction retardation of the liquid crystal cell in a state of the black screen is defined as Rlc;

the sum of thickness-direction retardations of the at least one birefringent layer (III) disposed between the first birefringent layer (I) and the second birefringent layer (I) is defined as R3.

2. The liquid crystal display device according to claim 1, wherein the liquid crystal display device satisfies the following formulae (4) to (7):

$$(-0.87 \times Nzq^2 + 2.15 \times Nzq - 0.76) - 0.45 \leq Nz2 \tag{4}$$

$$Nz2 \leq (-0.87 \times Nzq^2 + 2.15 \times Nzq - 0.76) + 0.45 \tag{5}$$

$$(25 \text{ nm} \times Nzq^2 - 159 \text{ nm} \times Nzq + 311 \text{ nm}) - 40 \text{ nm} \leq R2 \tag{6}$$

$$R2 \leq (25 \text{ nm} \times Nzq^2 - 159 \text{ nm} \times Nzq + 311 \text{ nm}) + 40 \text{ nm} \tag{7},$$

where the Nz coefficient of each of the first and second birefringent layers (II) is defined as Nz2; and the in-plane retardation of each of the first and second birefringent layers (II) is defined as R2.

3. The liquid crystal display device according to claim 1, wherein the liquid crystal display device further comprises an anti-reflection film which has a surface on which protrusions smaller than a wavelength of a visible light beam are formed.

4. A liquid crystal display device, comprising in the following order:

a first polarizer;
a first birefringent layer (II);
a first birefringent layer (I) having an in-plane retardation adjusted to $\lambda/4$;
a liquid crystal cell including a pair of substrates facing each other and a liquid crystal layer interposed therebetween;
a second birefringent layer (I) having an Nz coefficient substantially equal to that of the first birefringent layer (I) and an in-plane retardation adjusted to $\lambda/4$;
a second birefringent layer (II) having an Nz coefficient and an in-plane retardation that are substantially equal to an Nz coefficient and an in-plane retardation of the first birefringent layer (II), respectively; and
a second polarizer, provided that the birefringent layers (I) are defined as a birefringent layer satisfying the relation of nx>ny≧nz; the birefringent layers (II) are defined as a birefringent layer satisfying the relation of nx<ny≦nz; and a birefringent layer (III) is defined as a birefringent layer satisfying the relation of nx≈ny≧nz, where "nx" and "ny" represent respective principal refractive indices of a layer in the in-plane direction for a light beam at a wavelength of 550 nm, and "nz" represents the principal refractive index thereof in the out-of-plane thickness direction for a light beam at a wavelength of 550 nm, wherein the device comprises at least one birefringent layer (III) disposed at least one of: between the first birefringent layer (I) and the liquid crystal cell; and between the liquid crystal cell and the second birefringent layer (I), the first birefringent layer (I) has an in-plane slow axis forming an angle of about 45° with an absorption axis of the first polarizer, the second birefringent layer (I) has an in-plane slow axis substantially orthogonal to the in-plane slow axis of the first birefringent layer (I), the second polarizer has an absorption axis substantially orthogonal to the absorption axis of the first polarizer, the first birefringent layer (II) has an in-plane fast axis substantially orthogonal to the absorption axis of the first polarizer;

the second birefringent layer (II) has an in-plane fast axis substantially orthogonal to the absorption axis of the second polarizer, the device displays a black screen by aligning liquid crystal molecules in the liquid crystal layer substantially vertically to the substrate surface, wherein the liquid crystal display device satisfies $2.00 \leq Nzq$, where the Nz coefficient of each of the first and second birefringent layers (I) is defined as Nzq.

5. The liquid crystal display device according to claim 4, wherein the liquid crystal display device further comprises an anti-reflection film which has a surface on which protrusions smaller than a wavelength of a visible light beam are formed.

6. A liquid crystal display device, comprising in the following order:

a first polarizer;
a first birefringent layer (II);
a first birefringent layer (I) having an in-plane retardation adjusted to $\lambda/4$;
a liquid crystal cell including a pair of substrates facing each other and a liquid crystal layer interposed therebetween;
a second birefringent layer (I) having an Nz coefficient substantially equal to that of the first birefringent layer (I) and an in-plane retardation adjusted to $\lambda/4$;
a second birefringent layer (II) having an Nz coefficient and an in-plane retardation that are substantially equal to an Nz coefficient and an in-plane retardation of the first birefringent layer (II), respectively; and a second polarizer, provided that the birefringent layers (I) are defined as a birefringent layer satisfying the relation of nx>ny≧nz; the birefringent layers (II) are defined as a birefringent layer satisfying the relation of nx<ny≦nz; and a birefringent layer (III) is defined as a birefringent layer satisfying the relation of nx≈ny≧nz, where "nx" and "ny" represent respective principal refractive indices of a layer in the in-plane direction for a light beam at a wavelength of 550 nm, and "nz" represents the principal refractive index thereof in the out-of-plane thickness direction for a light beam at a wavelength of 550 nm, wherein the device comprises at least one birefringent layer (III) disposed at least one of: between the first birefringent layer (I) and the liquid crystal cell; and between the liquid crystal cell and the second birefringent layer (I), the first birefringent layer (I) has an in-plane slow axis forming an angle of about 45° with an absorption axis of the first polarizer, the second birefringent layer (I) has an in-plane slow axis substantially orthogonal to the in-plane slow axis of the first birefringent layer (I), the second polarizer has an absorption axis substantially orthogonal to the absorption axis of the first polarizer, the first birefringent layer (II) has an in-plane fast axis substantially orthogonal to the absorption axis of the first polarizer;

the second birefringent layer (II) has an in-plane fast axis substantially orthogonal to the absorption axis of the second polarizer, the device displays a black screen by aligning liquid crystal molecules in the liquid crystal layer substantially vertically to the substrate surface, wherein the liquid crystal display device satisfies Nzq<2.00, −0.45≦Nz2≦0, and 5 nm≦R2≦133 nm, where the Nz coefficient of each of the first and second birefringent layers (I) is defined as Nzq; the Nz coefficient of each of the first and second birefringent layers (II) is defined as Nz2; and the in-plane retardation of each of the first and second birefringent layers (II) is defined as R2.

7. The liquid crystal display device according to claim 6, wherein the liquid crystal display device further comprises an anti-reflection film which has a surface on which protrusions smaller than a wavelength of a visible light beam are formed.

* * * * *